United States Patent
Matsuda et al.

(10) Patent No.: US 6,466,215 B1
(45) Date of Patent: Oct. 15, 2002

(54) ANIMATION CREATING APPARATUS AND METHOD AS WELL AS MEDIUM HAVING ANIMATION CREATING PROGRAM RECORDED THEREON

(75) Inventors: Takahiro Matsuda; Satoshi Iwata; Yuji Takahashi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/345,504

(22) Filed: Jul. 1, 1999

(30) Foreign Application Priority Data

Sep. 25, 1998 (JP) .............................. 10-270720

(51) Int. Cl.[7] .............................................. G06T 13/00
(52) U.S. Cl. ........................ 345/475; 345/473; 345/474
(58) Field of Search ................................. 345/473, 474, 345/475

(56) References Cited

U.S. PATENT DOCUMENTS 5,732,232 A * 3/1998 Brush, II et al. ............ 345/473
6,031,549 A * 2/2000 Hayes-Roth et al. ........ 345/473

FOREIGN PATENT DOCUMENTS

| JP | 5-28237 | 5/1993 |
| JP | 6-333005 | 2/1994 |

* cited by examiner

Primary Examiner—Mark Zimmerman
Assistant Examiner—Philip H. Stevenson
(74) Attorney, Agent, or Firm—Staas & Halsey LLP

(57) ABSTRACT

A storage unit includes a part table which stores animation parts indicative of actions and expressions of a person divided into a plurality of frames and which further stores attribute values of the animation parts. An entry unit is used to enter the attribute values of the animation parts in accordance with the proceeding steps of a story. An arithmetic unit selects animation parts from the storage unit using the attribute values entered through the entry unit and creates an animation in conformity with the story.

24 Claims, 32 Drawing Sheets

FIG. 2 PRIOR ART
【ANIMATION PARTS】  【ANIMATION SEQUENCE】
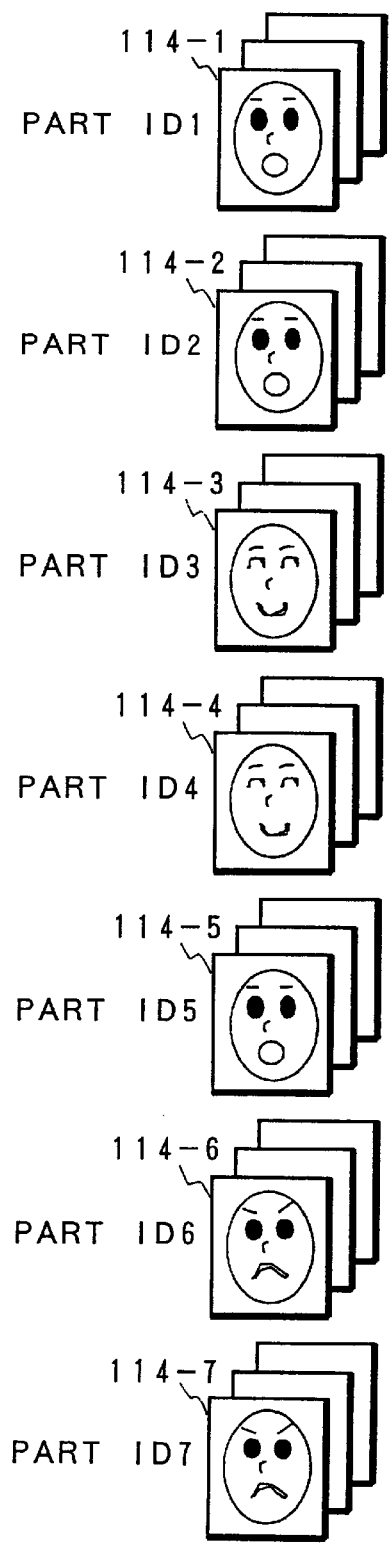
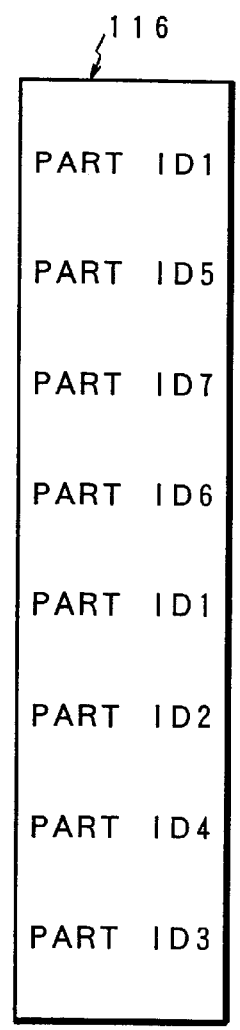

FIG. 4A
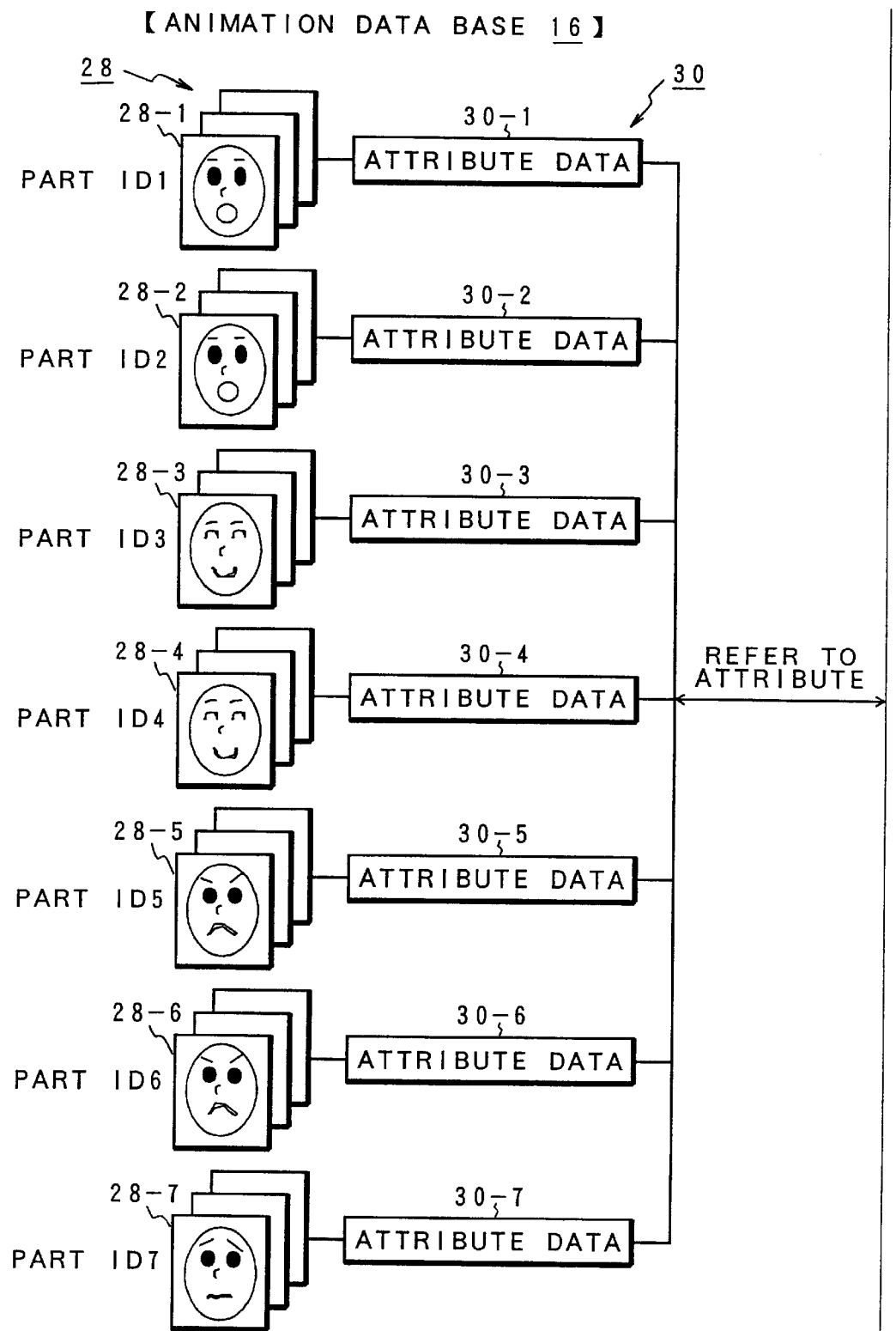

[ANIMATION SEQUENCE]

F I G. 5

30

| ATTRIBUTE ITEMS 36 | ATTRIBUTE VALUES 38 | | | | | | |
|---|---|---|---|---|---|---|---|
| | PART ID1 | PART ID2 | PART ID3 | PART ID4 | PART ID5 | PART ID6 | PART ID7 |
| ANIMATION PART ID 40 | 001 | 001 | 001 | 001 | 001 | 001 | 001 |
| CHARACTER ID 42 | SERIOUS LOOK | SERIOUS LOOK | SMILING FACE | SMILING FACE | ANGRY LOOK | ANGRY LOOK | SAD LOOK |
| EXPRESSION 44 | UTTERING | SHUT | UTTERING | SHUT | UTTERING | SHUT | UTTERING |
| STATE OF MOUTH 46 | OPEN | BLINKING | OPEN | BLINKING | OPEN | BLINKING | OPEN |
| STATE OF EYES 48 | FRONT | FRONT | FRONT | FRONT | FRONT | FRONT | FRONT |
| DIRECTION OF FACE 50 | | | | | | | |

FIG. 6

| STORY ENTRY 54 | STEP I | STEP II |
|---|---|---|
| CHARACTER ID 42 | 001 | 001 |
| EXPRESSION 44 | SERIOUS LOOK | SERIOUS LOOK |
| STATE OF MOUTH 46 | UTTERING | UTTERING |
| STATE OF EYES 48 | OPEN | OPEN |
| DIRECTION OF FACE 50 | FRONT | FRONT |

ATTRIBUTE VALUE ENTRY 56

| STORY ENTRY 54 | | STEP I | STEP II |
|---|---|---|---|
| ATTRIBUTE VALUE ENTRY 56 | CHARACTER ID 42 | 001 | — |
| | EXPRESSION 44 | SERIOUS LOOK | SMILING FACE |
| | STATE OF MOUTH 46 | UTTERING | — |
| | STATE OF EYES 48 | OPEN | — |
| | DIRECTION OF FACE 50 | FRONT | — |

52

F I G. 8
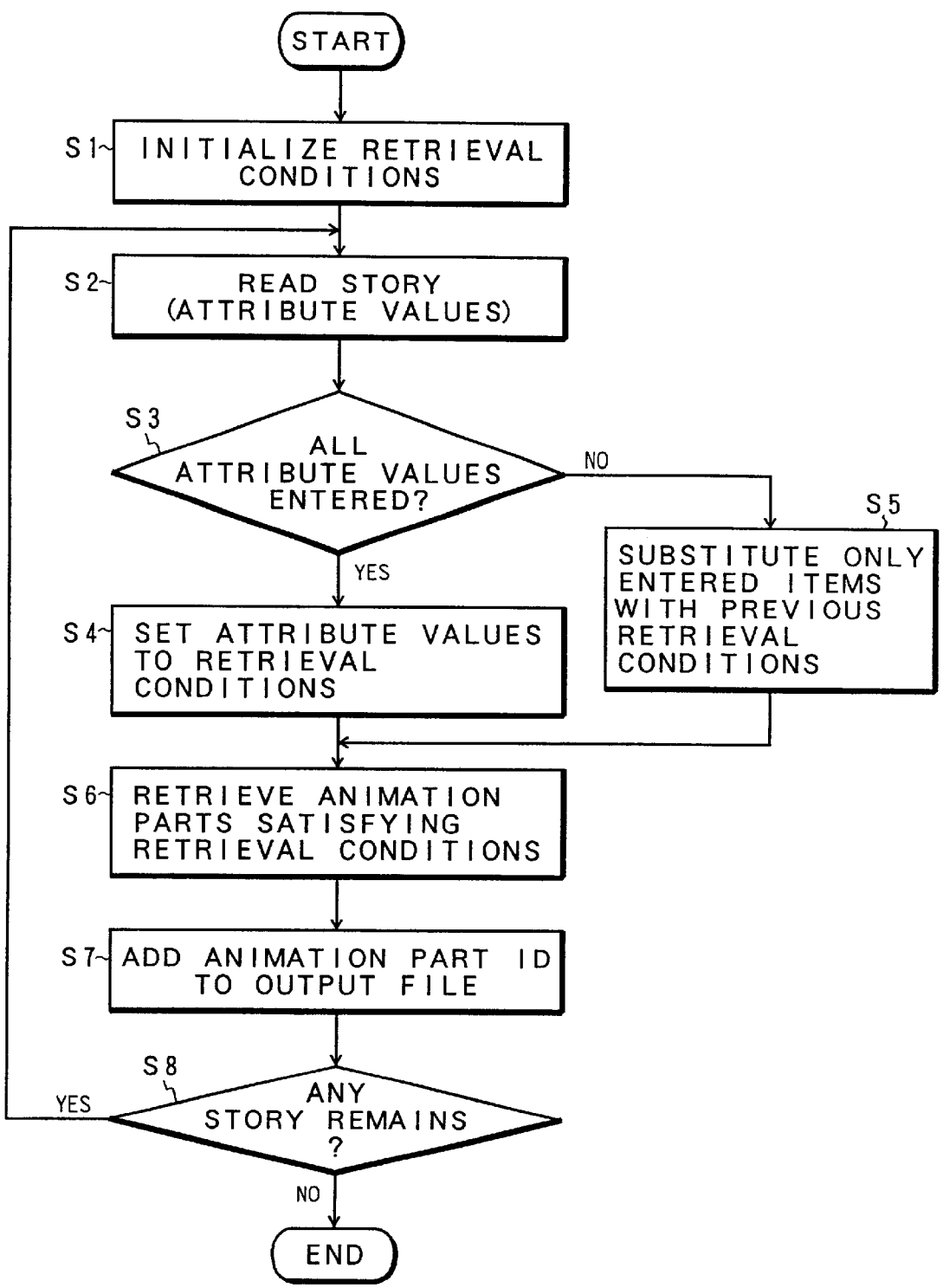

FIG. 9A

30 ATTRIBUTE DATA TABLE

| ATTRIBUTE ITEMS 36 | ATTRIBUTE VALUES 38 | | |
|---|---|---|---|
| REPETITION 60 | PERMITTED | PERMITTED | PERMITTED |
| ANIMATION PART ID 40 | PART ID1 | PART ID2 | PART ID3 |
| CHARACTER ID 42 | 001 | 001 | 001 |
| EXPRESSION AT FIRST FRAME 44-1 | SERIOUS LOOK | SMILING FACE | ANGLY LOOK |
| EXPRESSION AT FINAL FRAME 44-2 | SERIOUS LOOK | SMILING FACE | ANGLY LOOK |
| EXPRESSION IN ANIMATION 44-3 | SERIOUS LOOK | SMILING FACE | ANGLY LOOK |
| STATE OF MOUTH AT FIRST FRAME 46-1 | SHUT | SHUT | SHUT |
| STATE OF MOUTH AT FINAL FRAME 46-2 | SHUT | SHUT | SHUT |
| STATE OF MOUTH IN ANIMATION 46-3 | OPEN & SHUT | OPEN & SHUT | OPEN & SHUT |
| STATE OF EYES AT FIRST FRAME 48-1 | OPEN | OPEN | OPEN |
| STATE OF EYES AT FINAL FRAME 48-2 | OPEN | OPEN | OPEN |
| STATE OF EYES IN ANIMATION 48-3 | OPEN | OPEN | OPEN |
| DIRECTION OF FACE AT FIRST FRAME 50-1 | FRONT | FRONT | FRONT |
| DIRECTION OF FACE AT FINAL FRAME 50-2 | FRONT | FRONT | FRONT |
| DIRECTION OF FACE IN ANIMATION 50-3 | FRONT | FRONT | FRONT |

FIG. 9B

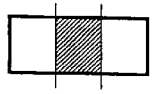

| ATTRIBUTE VALUES 38 | | |
|---|---|---|
| PROHIBITED | PROHIBITED | PROHIBITED |
| PART ID4 | PART ID5 | PART ID6 |
| 001 | 001 | 001 |
| SERIOUS LOOK | SMILING FACE | SERIOUS LOOK |
| SMILING FACE | SERIOUS LOOK | ANGLY LOOK |
| SERIOUS LOOK ↓ SMILING FACE | SMILING FACE ↓ SERIOUS LOOK | SERIOUS LOOK ↓ ANGLY LOOK |
| SHUT | SHUT | SHUT |
| SHUT | SHUT | SHUT |
| SHUT | SHUT | SHUT |
| OPEN | OPEN | OPEN |
| OPEN | OPEN | OPEN |
| OPEN | OPEN | OPEN |
| FRONT | FRONT | FRONT |
| FRONT | FRONT | FRONT |
| FRONT | FRONT | FRONT |

FIG. 9C

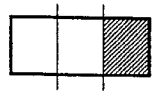

| ATTRIBUTE VALUES | | |
|---|---|---|
| PROHIBITED | PROHIBITED | PROHIBITED |
| PART ID7 | PART ID8 | PART ID9 |
| 001 | 001 | 001 |
| ANGLY LOOK | SMILING FACE | ANGLY LOOK |
| SERIOUS LOOK | SMILING FACE | SMILING FACE |
| ANGLY LOOK ↓ SERIOUS LOOK | SMILING FACE ↓ ANGLY LOOK | ANGLY LOOK ↓ SMILING FACE |
| SHUT | SHUT | SHUT |
| SHUT | SHUT | SHUT |
| SHUT | SHUT | SHUT |
| OPEN | OPEN | OPEN |
| OPEN | OPEN | OPEN |
| OPEN | OPEN | OPEN |
| FRONT | FRONT | FRONT |
| FRONT | FRONT | FRONT |
| FRONT | FRONT | FRONT |

FIG. 12A

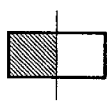

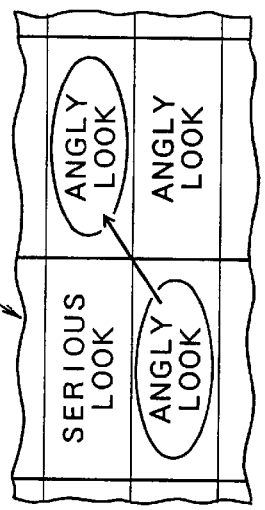

52-1

| STORY ENTRY 54 | STEP I | STEP II |
|---|---|---|
| REPETITION 60 | PERMITTED | PERMITTED |
| CHARACTER ID 42 | 001 | 001 |
| EXPRESSION AT FIRST FRAME 44-1 | SERIOUS LOOK | ANGLY LOOK |
| EXPRESSION AT FINAL FRAME 44-2 | SERIOUS LOOK | ANGLY LOOK |
| EXPRESSION IN ANIMATION 44-3 | SERIOUS LOOK | ANGLY LOOK |
| STATE OF MOUTH AT FIRST FRAME 46-1 | SHUT | SHUT |
| STATE OF MOUTH AT FINAL FRAME 46-2 | SHUT | SHUT |
| STATE OF MOUTH IN ANIMATION 46-3 | OPEN & SHUT | OPEN & SHUT |

56 ATTRIBUTE VALUE ENTRY

52 STORY ENTRY TABLE

| ATTRIBUTE VALUE ENTRY | | |
|---|---|---|
| STATE OF EYES AT FIRST FRAME 48-1 | OPEN | |
| STATE OF EYES AT FINAL FRAME 48-2 | OPEN | |
| STATE OF EYES IN ANIMATION 48-3 | OPEN | |
| DIRECTION OF FACE AT FIRST FRAME 50-1 | FRONT | |
| DIRECTION OF FACE AT FINAL FRAME 50-2 | FRONT | |
| DIRECTION OF FACE IN ANIMATIOB 50-3 | FRONT | |

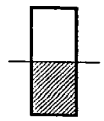
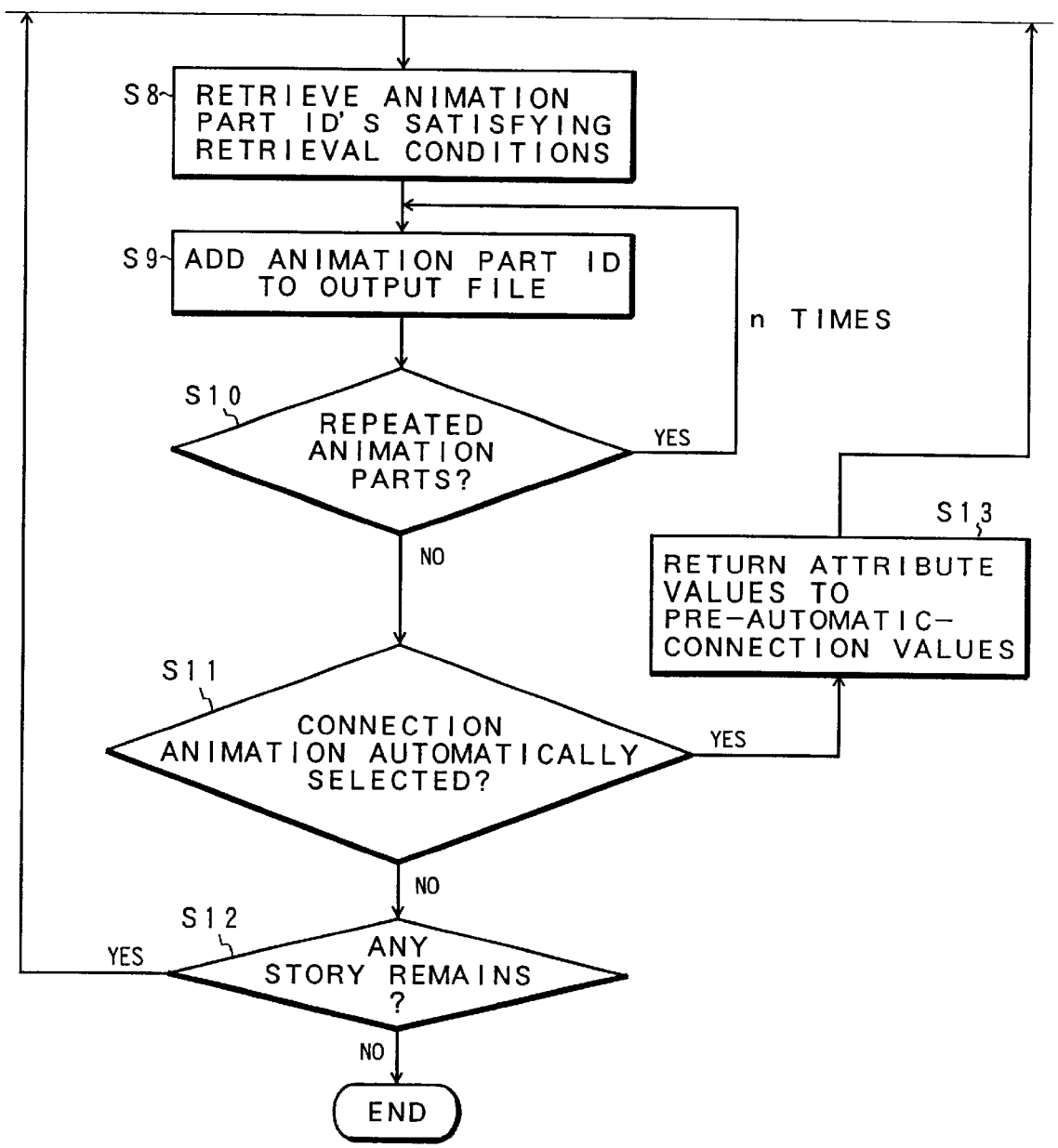
FIG. 13B

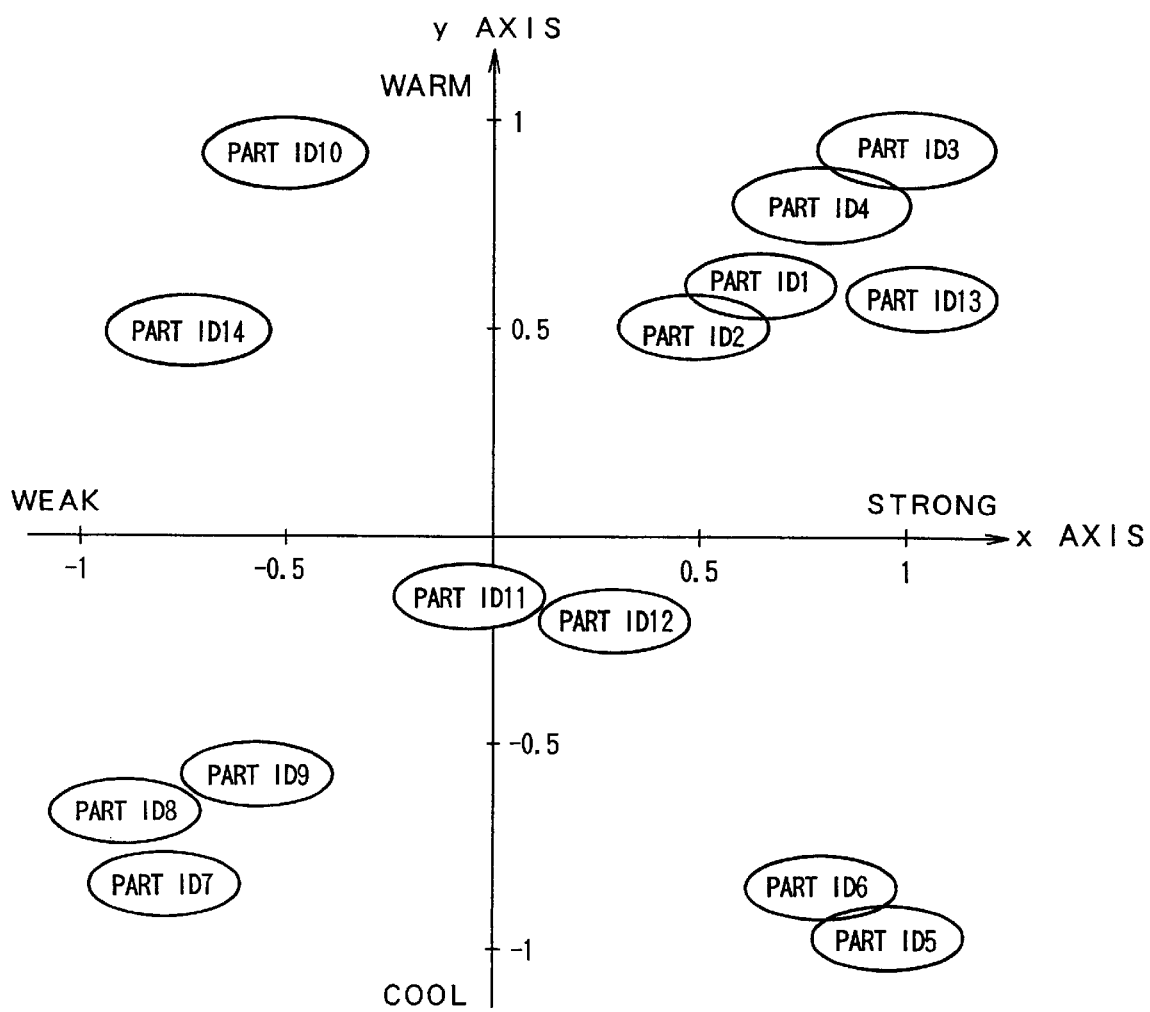

FIG. 15

| ATTRIBUTE ITEMS 36 | ATTRIBUTE VALUES 38 | | | | | | |
|---|---|---|---|---|---|---|---|
| | PART ID1 | PART ID2 | PART ID3 | PART ID4 | PART ID5 | PART ID6 | PART ID7 |
| ANIMATION PART ID 40 | 001 | 001 | 001 | 001 | 001 | 001 | 001 |
| CHARACTER ID 42 | | | | | | | |
| EXPRESSION 44 | SERIOUS LOOK | SERIOUS LOOK | SMILING FACE | SMILING FACE | ANGRY LOOK | ANGRY LOOK | SAD LOOK |
| STATE OF MOUTH 46 | UTTERING | SHUT | UTTERING | SHUT | UTTERING | SHUT | UTTERING |
| STATE OF EYES 48 | OPEN | BLINKING | OPEN | BLINKING | OPEN | BLINKING | OPEN |
| DIRECTION OF FACE 50 | FRONT | FRONT | FRONT | FRONT | FRONT | FRONT | FRONT |
| IMPRESSION x VALUE 72 | 0.7 | 0.5 | 1.0 | 0.8 | 0.9 | 0.7 | −0.8 |
| IMPRESSION y VALUE 74 | 0.6 | 0.5 | 1.0 | 0.9 | −1.0 | −0.8 | −0.8 |

| STORY ENTRY | | STEP I | STEP II |
|---|---|---|---|
| ATTRIBUTE VALUE ENTRY 56 | CHARACTER ID 42 | 001 | 001 |
| | EXPRESSION 44 | SERIOUS LOOK | MOST RECENT POINT |
| | STATE OF MOUTH 46 | UTTERING | UTTERING |
| | STATE OF EYES 48 | OPEN | OPEN |
| | DIRECTION OF FACE 50 | FRONT | FRONT |

54

52

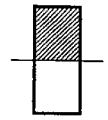
FIG. 17A
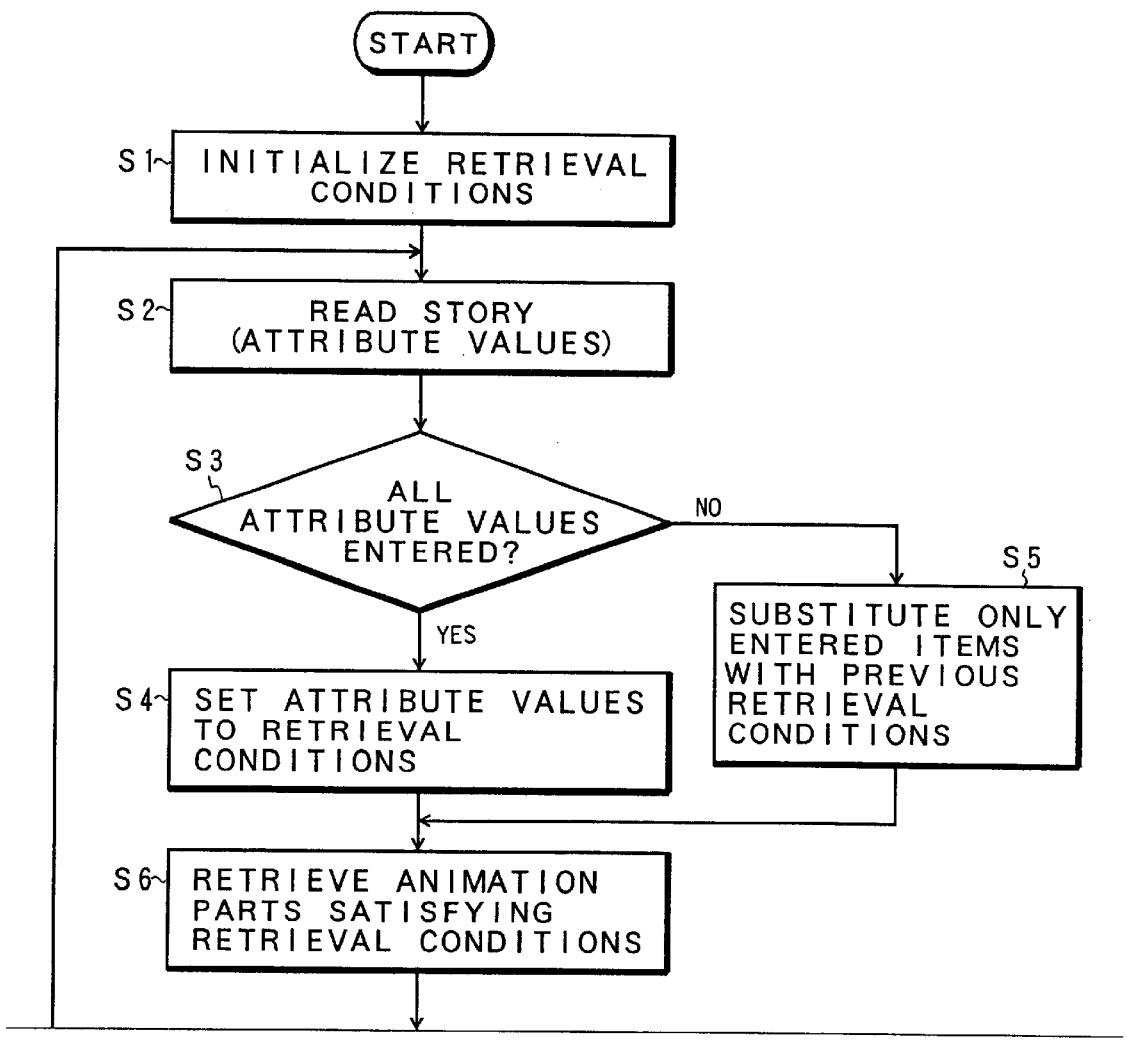

FIG. 19

| ATTRIBUTE ITEMS | ATTRIBUTE VALUES | | | | | | |
|---|---|---|---|---|---|---|---|
| | PART ID1 | PART ID2 | PART ID3 | PART ID4 | PART ID5 | PART ID6 | PART ID7 |
| ANIMATION PART ID 40 | 001 | 001 | 001 | 001 | 001 | 001 | 001 |
| CHARACTER ID 42 | | | | | | | |
| EXPRESSION 44 | SERIOUS LOOK | SERIOUS LOOK | SMILING FACE | SMILING FACE | ANGRY LOOK | ANGRY LOOK | SAD LOOK |
| STATE OF MOUTH 46 | UTTERING | SHUT | UTTERING | SHUT | UTTERING | SHUT | UTTERING |
| STATE OF EYES 48 | OPEN | BLINKING | OPEN | BLINKING | OPEN | BLINKING | OPEN |
| DIRECTION OF FACE 50 | FRONT | FRONT | FRONT | FRONT | FRONT | FRONT | FRONT |
| CATEGORY NAME 76 | A | A | A | A | B | B | D |

FIG. 20

| ATTRIBUTE VALUE ENTRY 56 | STORY ENTRY 54 | STEP I | STEP II |
|---|---|---|---|
| | CHARACTER ID 42 | 001 | 001 |
| | EXPRESSION 44 | SERIOUS LOOK | SAME CATEGORY |
| | STATE OF MOUTH 46 | UTTERING | UTTERING |
| | STATE OF EYES 48 | OPEN | OPEN |
| | DIRECTION OF FACE 50 | FRONT | FRONT |

52

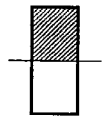
FIG. 21A
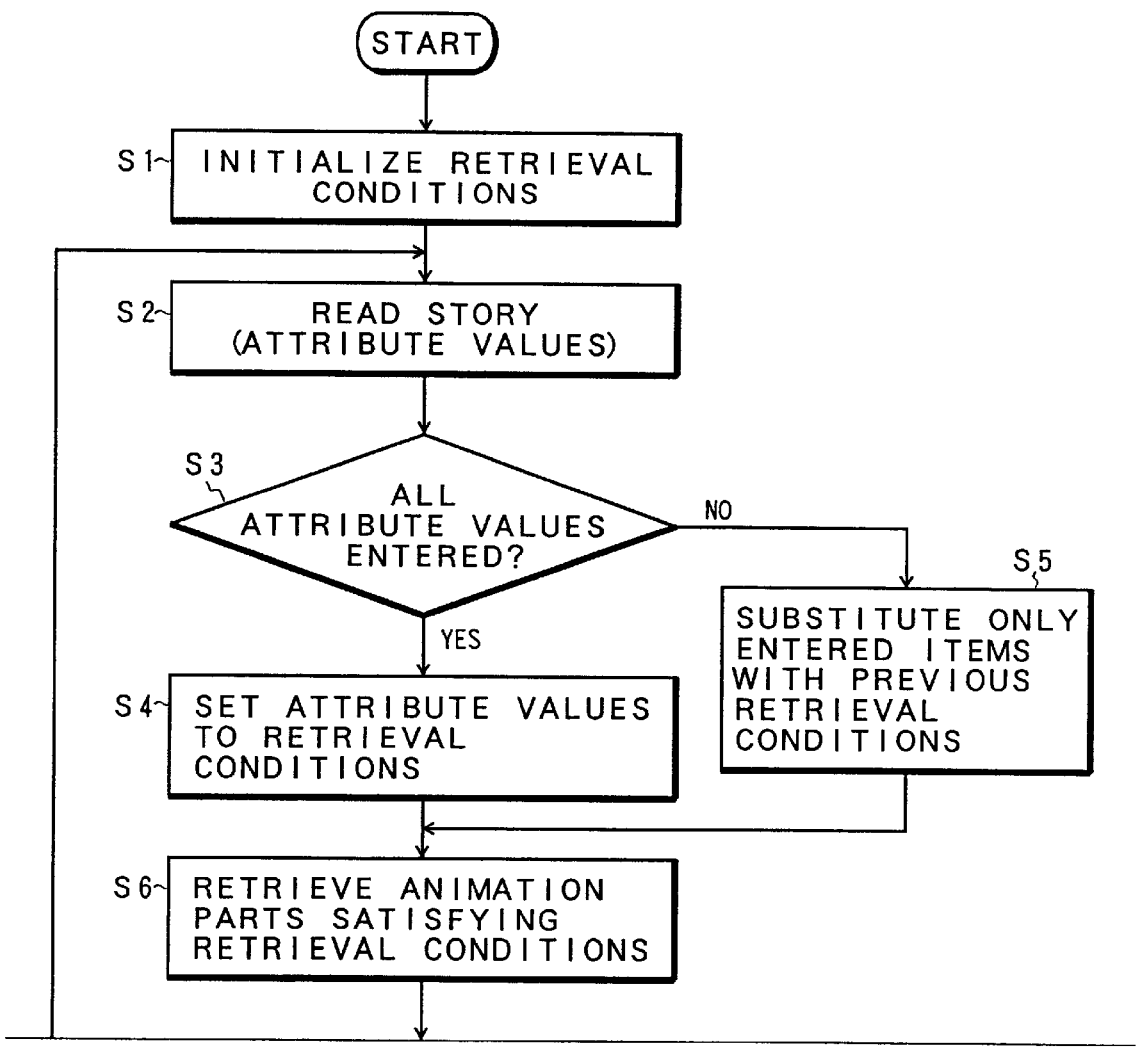

FIG. 21B
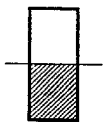
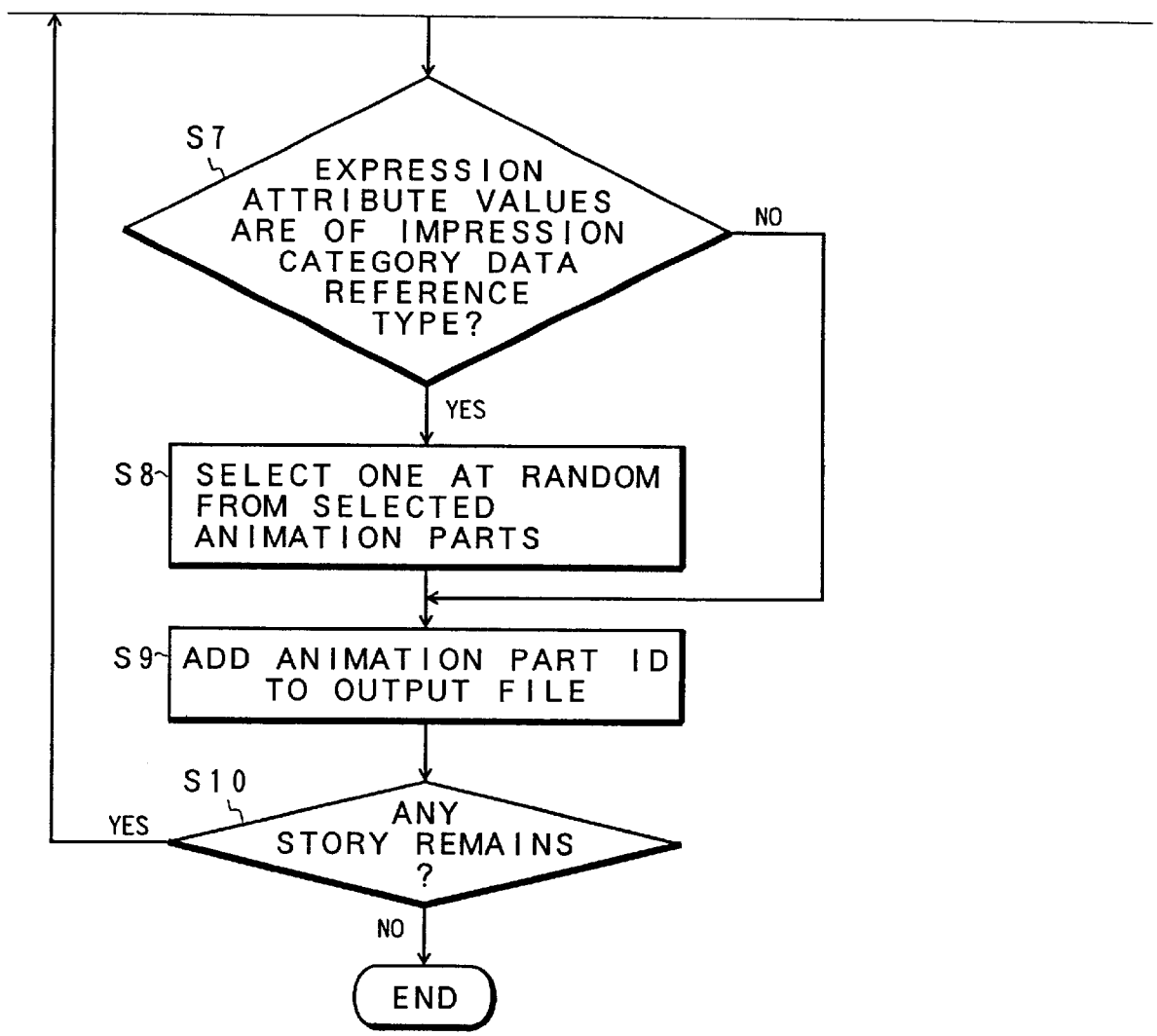

FIG. 22

| ATTRIBUTE ITEMS 36 | ATTRIBUTE VALUES 38 | | | | | | |
|---|---|---|---|---|---|---|---|
| | PART ID1 | PART ID2 | PART ID3 | PART ID4 | PART ID5 | PART ID6 | PART ID7 |
| ANIMATION PART ID 40 | 001 | 001 | 001 | 001 | 001 | 001 | 001 |
| CHARACTER ID 42 | SERIOUS LOOK | SERIOUS LOOK | SMILING FACE | SMILING FACE | ANGRY LOOK | ANGRY LOOK | SAD LOOK |
| EXPRESSION 44 | UTTERING | SHUT | UTTERING | SHUT | UTTERING | SHUT | UTTERING |
| STATE OF MOUTH 46 | OPEN | BLINKING | OPEN | BLINKING | OPEN | BLINKING | OPEN |
| STATE OF EYES 48 | FRONT | FRONT | FRONT | FRONT | FRONT | FRONT | FRONT |
| DIRECTION OF FACE 50 | A | A | A | A | B | B | D |
| CATEGORY NAME 76 | 1 | 3 | 2 | 4 | 1 | 2 | 1 |
| PRIORITY 80 | | | | | | | |

30

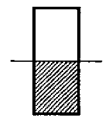
FIG. 23B
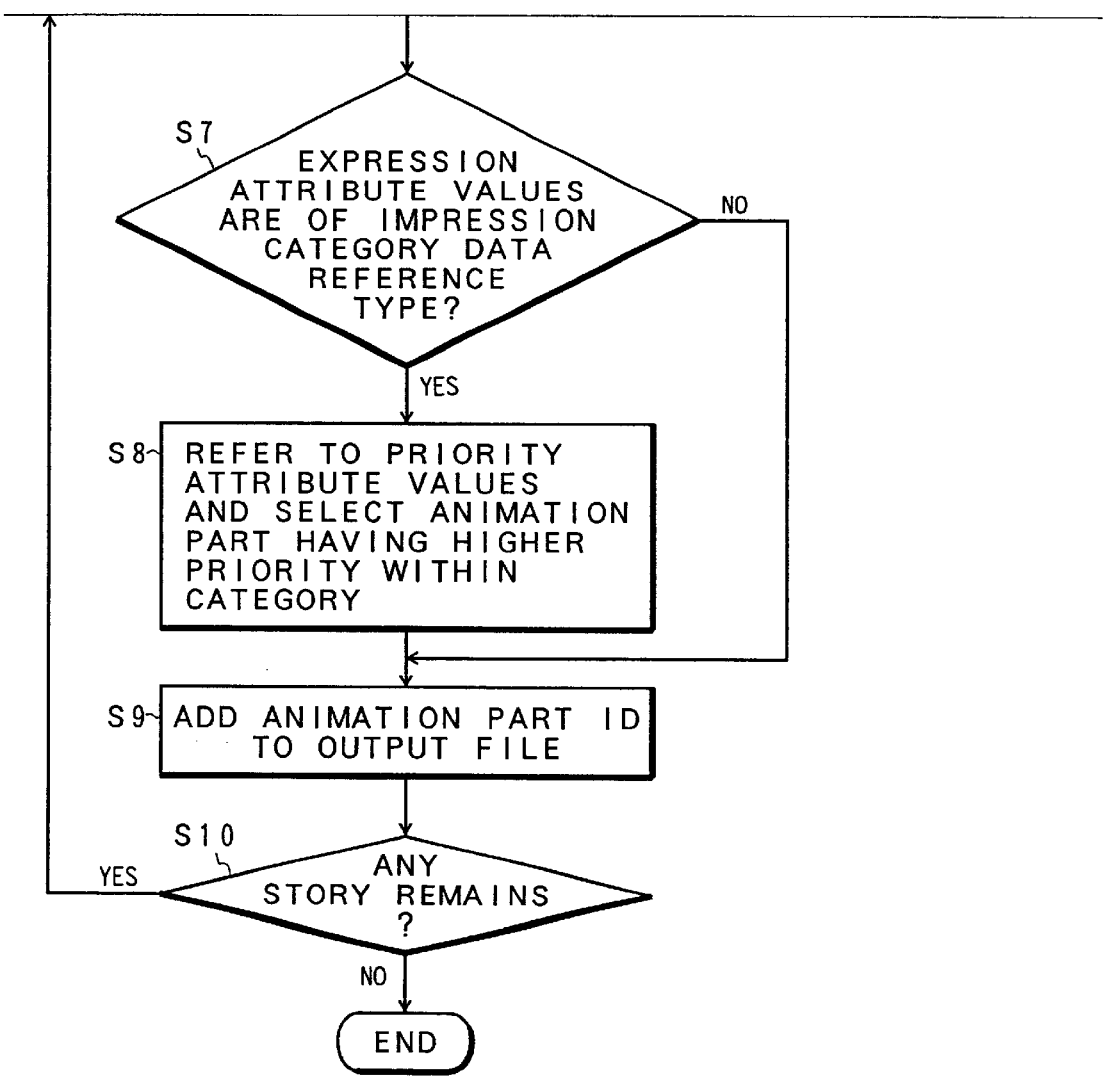

ANIMATION CREATING APPARATUS AND METHOD AS WELL AS MEDIUM HAVING ANIMATION CREATING PROGRAM RECORDED THEREON

BACKGROUND OF THE INVENTION

1. Field of the Invention

The present invention relates generally to an animation creating apparatus and method for automatically creating a character animation representative of the expression of face or of actions of a person on an application of a personal computer or the like, as well as to a medium having an animation creating program recorded thereon. More particularly, it is directed to an animation creating apparatus and method acting as an authoring tool for automatically creating a character animation work by use of animation parts, as well as to a medium having an animation creating program recorded thereon.

2. Description of the Related Arts

Nowadays a lot of attention is being paid to authoring tools for creating multimedia title animation works using personal computers or workstations. In that process, an attempt to part the contents is made to ensure effective authoring. In the authoring tools for character animations, a series of meaningful actions or expressions are divided into animation parts, which are linked together, as needed, to create animation works.

FIG. 1 depicts a conventional animation creating apparatus which is generally indicated at 100. The animation creating apparatus 100 is constituted by an entry unit 102, an arithmetic unit 104, a file 106 and a display unit 108. The arithmetic unit 104 is provided with a file control unit 110 and an animation composite unit 112. This animation creating apparatus 100 is concretely provided as an application program and is installed in a personal computer or a workstation for use as an authoring tool for creating an animation work. The file 106 stores for example animation parts 114-1 to 114-7 which are obtained by parting a series of motions or expressions of face as shown in FIG. 2. The animation parts 114-1 to 114-7 are given part IDs 1 to 7, respectively, as part names. In the case of creating an animation work, a story is first determined and then the animation parts 114-1 to 114-7 required for the story are selected in consideration for the context or mutual relationship. Based on the thus selected parts, animation part names are described in an animation sequence 116 in sequence, e.g., in the order of "ID1, ID5, . . . ID3" as shown. Finally, the animation parts are continuously reproduced in accordance with the animation sequence 116.

Incidentally, in order to create a high-quality animation work in conformity with the story, there is a need to take into consideration smooth variations in the expression or motions between the adjacent animation parts selected. In the prior art animation creating apparatus, however, the work for selecting and linking together animation parts in conformity with the story is a manual editing work, taking a lot of labor and time for the completion of the animation work. In other words, to obtain a high-quality animation presenting smooth variations in the expression or actions, there must be repeated a modifying work in which once created animation work is reedited while being reproduced, which results in laborious work for the completion. In particular, to create a high-quality animation, a plenty of animation parts must be prepared, so that increased number of the animation parts renders the editing work for the selection and linkage of animation parts more laborious.

SUMMARY OF THE INVENTION

According to the present invention there is provided an animation creating apparatus for simply editing an animation work ensuring a smooth variation in the expression and actions by use of animation parts of a character.

The animation creating apparatus of the present invention comprises a storage unit, an entry unit and an arithmetic unit. The storage unit stores animation parts indicative of a series of actions and expressions of a person divided into a plurality of frames and stores attribute values of the animation parts. The entry unit enters the animation part attribute values in accordance with proceeding of a story. The arithmetic unit selects animation parts from the storage unit using the animation part attribute values entered through the entry unit, and it links the thus selected animation parts together to create an animation in conformity with the story. In this manner, by storing as data base animation parts of a divided character as well as attribute values indicative of actions and expression of the animation parts, and by entering desired attribute values in each proceeding step of a story to select animation parts to be linked together, the actions and motions of the character are subjected smooth variations in accordance with the story entered by means of the attribute values whereby it is possible to simply edit an animation work having a higher quality by use of the animation parts.

The storage unit stores, as the animation part attribute values, attribute values consisting of a plurality of items such as the character ID, the expression of face, the state of mouth, the state of eyes and the direction of face. The storage unit stores repetitive animation parts which appear repetitively by the designated number of times, and non-repetitive animation parts which appear only once. The entry unit enters all attribute values consisting of a plurality of items in each proceeding step of the story. Instead, the entry unit may enter only attribute values which have changed from the preceding step in each proceeding step of the story so as to achieve an easy entry work. The storage unit stores attribute values of the foremost frame and the endmost frame, of the plurality of frames providing the animation parts. In this case, the arithmetic unit upon the selection of animation parts from the storage unit judges whether connectivity of animation parts is good or poor on the basis of attribute values in the current step and in the preceding step. The arithmetic unit, when poor connectivity is judged, changes the attribute value to reselect another animation part for better connectivity. More specifically, upon the selection of animation parts from the storage unit, the arithmetic unit compares an attribute value at the foremost frame in the current step with an attribute value at the endmost frame in the preceding step. The arithmetic unit, when non-coincidence is detected, judges the connectivity of animation parts to be defective and changes the attribute value at the endmost frame in the preceding step into the attribute value at the foremost frame in the current step to thereby reselect another animation part. In cases where the connectivity between two adjacent animation parts selected from the attribute values is poor with unsmooth variations in the actions and the expression, automatic selection of animation parts ensuring a smooth variation with better connectivity is carried out to remarkably reduce the work burden on the editing and enhance the quality of the animation work.

The storage unit stores, as impression data, coordinate values in a predetermined impression coordinate space, of a specific attribute value of the animation part. In this case, the entry unit enters, in place of attribute values, impression distance conditions such as a closest point or a farthest point in the impression coordinate space. When the impression distance conditions are entered in place of the attribute values, the arithmetic unit selects animation parts satisfying the thus entered impression distance conditions relative to animation parts selected in the preceding step. Herein, the impression coordinate space is a two-dimensional coordinate space having a coordinate axis along which the impression varies from strong to weak and having a coordinate axis along which the impression varies from warm to cold, with respect to the expression of face as the specific attribute values. The storage unit stores, as impression data, categories, which are impression regions defined in a predetermined impression coordinate space, of specific attribute values of the animation parts. In this case, the entry unit enters and designates, in place of an attribute value, a category in the impression coordinate space. The arithmetic unit selects an animation part belonging to the thus entered and designated category. Herein, if a plurality of animation parts lie within the thus entered and designated category, the arithmetic unit selects one of the plurality of animation parts at random. The storage unit further stores not only the impression data of the category to which the coordinate values belong in the impression coordinate space but also priorities of animation parts belonging to the same category. In such a case, the arithmetic unit, if a plurality of animation parts lie within the thus entered and designated category, selects one of the plurality of animation parts in accordance with the priorities. In this manner, by storing impression data as the attribute values of the animation parts and by entering the impression data as the attribute values, it is possible to designate the impression of an animation to be created such as warmness or sadness in the expression of face, to thereby assure that the total impression of the finished animation work results in the designated impression. Furthermore, use of the impression data simplifies the entry of the attribute values.

The present invention further provides an animation creating method for simply editing an animation work ensuring a smooth variation in the expression and actions by use of animation part of a character, the method comprising:

a storage step for storing animation parts indicative of a series of actions and expressions of a person divided into a plurality of frames and for storing attribute values of the animation parts;

an entry step for entering the animation part attribute values in accordance with proceeding of a story; and an arithmetic step for selecting animation parts from the storage step using the animation part attribute values entered through the entry step, the arithmetic step linking the thus selected animation parts together to create an animation in conformity with the story.

The details of this animation creating method are substantially the same as those in the case of the apparatus configuration.

In addition, the present invention provides a computer readable record medium in which is stored an animation creating program for simply editing an animation work ensuring a smooth variation in the expression and actions by use of animation parts of a character. The animation creating program stored in the storage medium comprises a storage module for storing into a storage unit animation parts indicative of a series of actions and expressions of a person divided into a plurality of frames and for storing attribute values of the animation parts; an entry module for entering the animation part attribute values in accordance with proceeding of a story; and an arithmetic module for selecting animation parts from the storage module using the animation part attribute values entered through the entry module, the arithmetic module linking the thus selected animation parts together to create an animation in conformity with the story.

The above and other objects, aspects, features and advantages of the present invention will become more apparent from the following detailed description with reference to the accompanying drawings.

BRIEF DESCRIPTION OF THE DRAWINGS

FIG. 2 is an explanatory diagram of animation creating processing in which animation parts are manually selected and linked together;

FIGS. 4A and 4B are explanatory diagrams of a function structure of animation creating processing effected in FIG. 3;

FIG. 5 is an explanatory diagram of an attribute data table provided in an animation data base of FIG. 3;

FIG. 6 is an explanatory diagram of a story entry table in which all attribute values have been entered by an entry unit of FIG. 3;

FIG. 7 is an explanatory diagram of the story entry table in which only attribute values different from those in the preceding step have been entered by the entry unit of FIG. 3;

FIG. 8 is a flowchart of the animation creating processing of FIG. 3;

FIGS. 12A and 12B are explanatory diagrams of processing effected when a discontinuity of the attribute values has occurred between the adjacent steps;

FIGS. 13A and 13B are flowcharts of the animation creating processing of the present invention provided with a processing function for eliminating the discontinuity of the attribute values of FIG. 12;

FIG. 14 is an explanatory diagram of an impression coordinate space defined by impression data;

FIG. 15 is an explanatory diagram of the attribute data table of the present invention, which stores coordinate values of the impression data of FIGS. 13A and 13B;

FIG. 16 is an explanatory diagram of a story entry table in which coordinate values of the impression data are entered in place of the attribute values;

FIG. 19 is an explanatory diagram of the attribute data table of the present invention which stores, as the attribute values, category names in the impression coordinate space of FIG. 18;

FIG. 20 is an explanatory diagram of a story entry table in which impression category names are entered in place of the attribute values;

FIGS. 21A and 21B are flowcharts of the animation creating processing of the present invention using the impression categories of FIG. 20;

FIG. 22 is an explanatory diagram of the attribute table of the present invention which stores category names in the impression space of FIG. 18 and priorities within the same category; and FIGS. 23A and 23B are flowcharts of the animation creating processing of the present invention using the impression categories and priorities of FIG. 22.

DETAILED DESCRIPTION OF THE PREFERRED EMBODIMENTS

Figure 1:
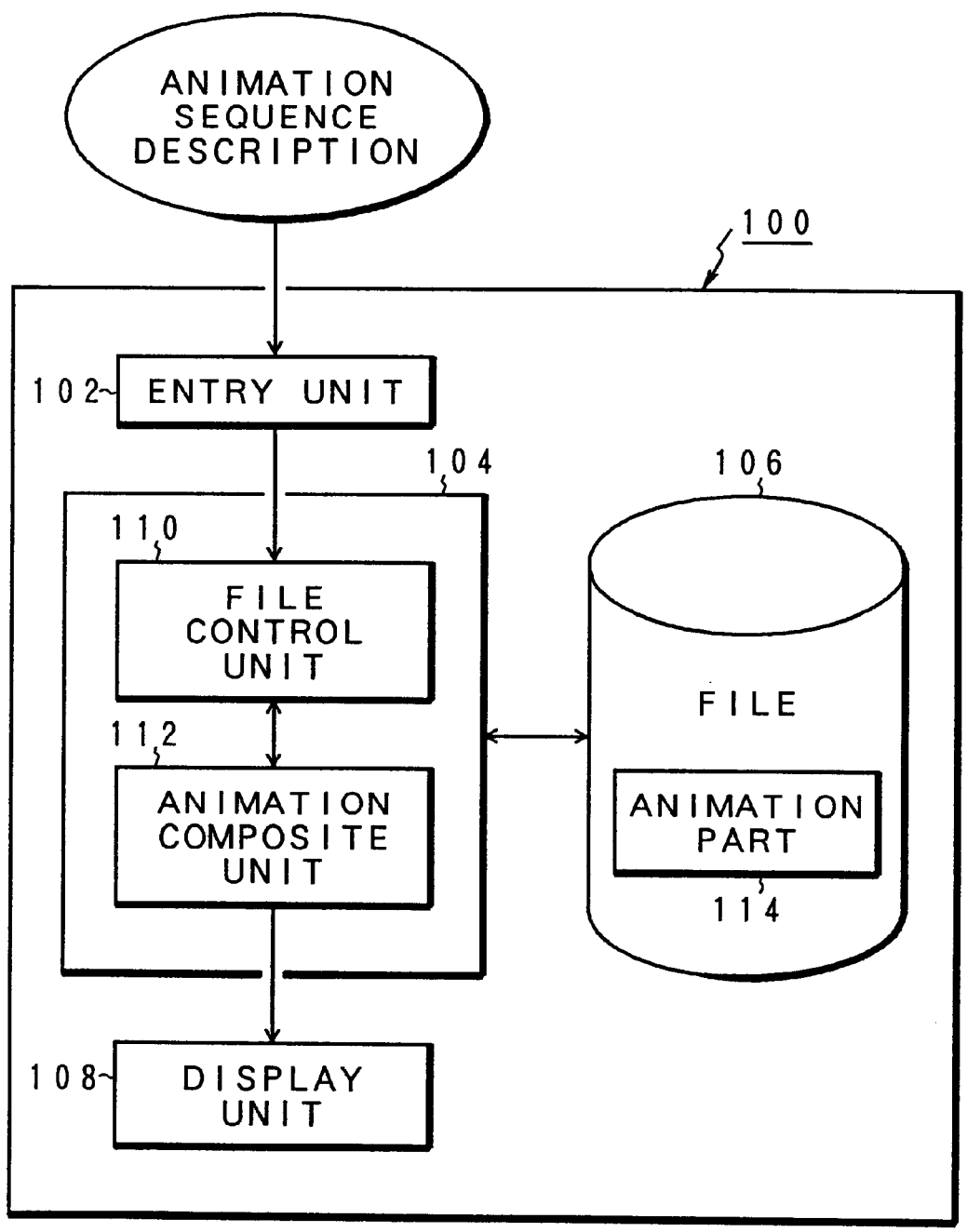
FIG. 1 is a block diagram of a conventional animation creating apparatus.
Figure 3:
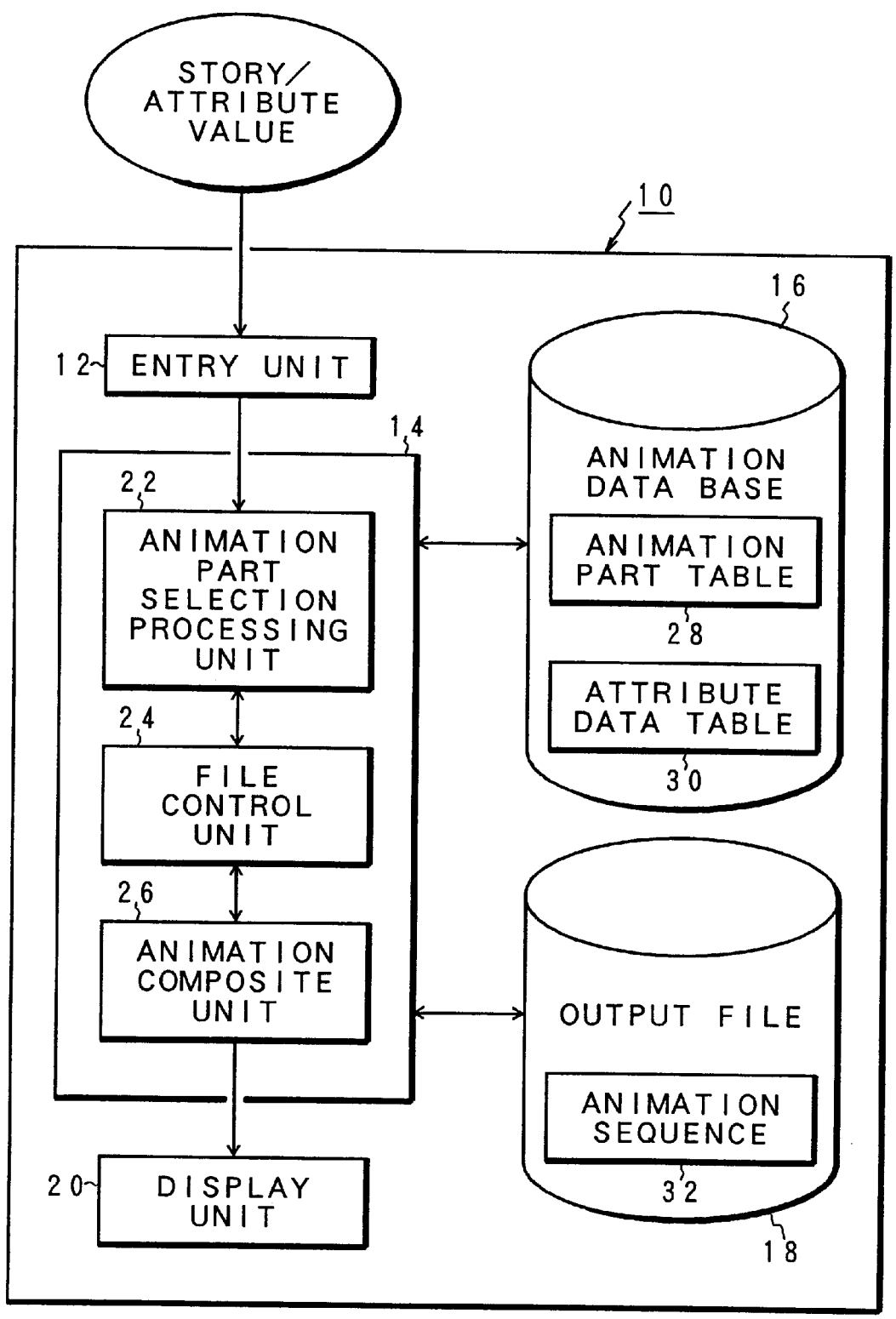
FIG. 3 is a function block diagram of an animation creating apparatus of the present invention.

FIG. 3 is a function block diagram of an animation creating apparatus in accordance with the present invention. The animation creating apparatus of the present invention is generally designated at 10 and is constituted by an entry unit 12, an arithmetic unit 14, an animation data base 16 serving as a storage unit, an output file 18 and a display unit 20. More concretely, the animation creating apparatus 10 is a personal computer, a workstation or the like, the entry unit 12 includes a keyboard and a mouse, the arithmetic unit 14 is an MPU, the animation data base 16 and the output file 18 are in the form of a hard disk drive, a memory or the like, and the display unit 20 is a CIT display for example. The arithmetic unit 14 comprises an animation part selection processing unit 22, a file control unit 24 and an animation composite unit 26. The animation data base 16 stores therein a part table 28 for storing animation parts and an attribute data table 30 for storing attribute data. The output file 18 stores therein an animation sequence 32 for reproducing animations created by the arithmetic unit 14.

Figure 4B:
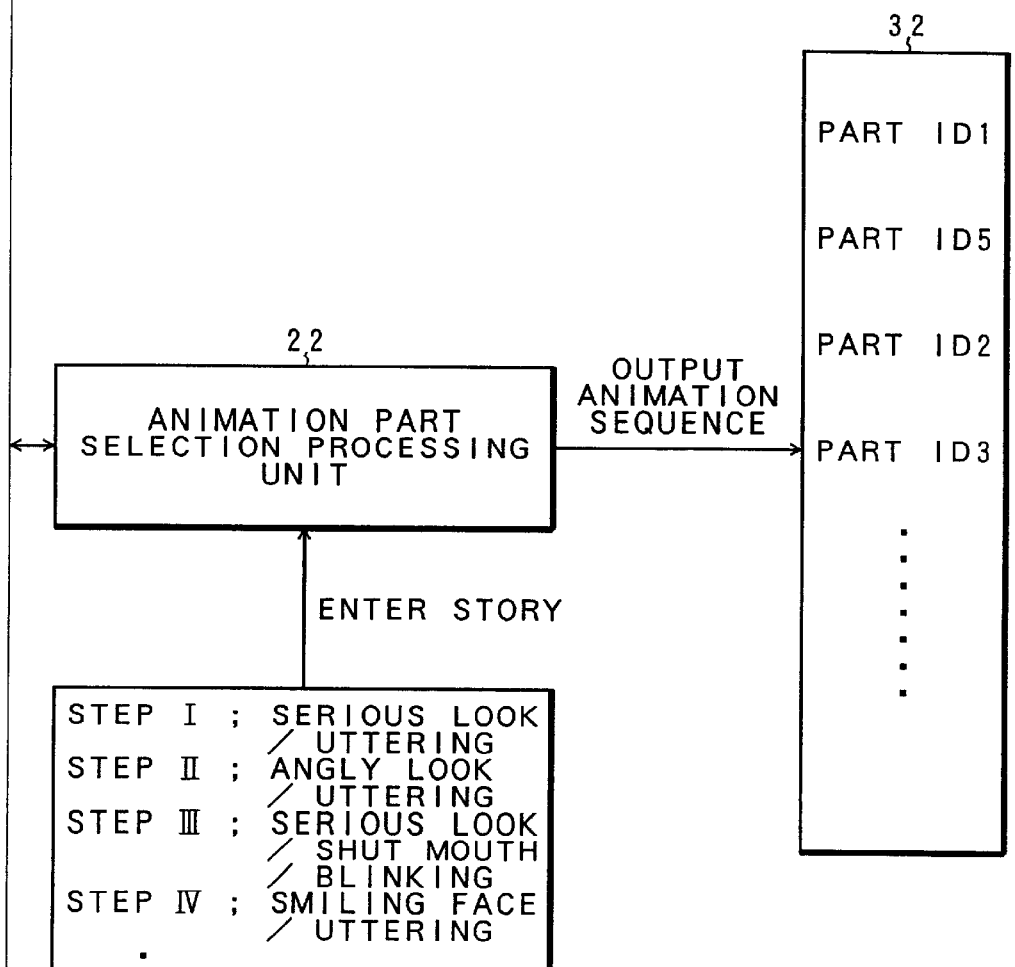

FIGS. 4A and 4B show a procedure of animation creating processing effected by the animation creating apparatus 10 of FIG. 3. First, the part table 28 in the animation data base 16 stores animation parts 28-1 to 28-7. The animation parts 28-1 to 28-7 are obtained by parting a series of actions or expressions of a person into a plurality of frames. This embodiment employs animation parts of expressions of the face of a character by way of example. Correspondingly to the animation parts 28-1 to 28-7, the attribute data table 30 stores their respective attribute data 30-1 to 30-7. These attribute data 30-1 to 30-7 result specifically in the storage contents of the attribute data table 30 of FIG. 5.

The attribute data table 30 of FIG. 5 consists of attribute items 36 of the animation parts and attribute values 38 thereof. The attribute items 36 include an animation part ID 40, a character ID 42, the expression of face 44, the state of mouth 46, the state of eyes 48 and the direction of face 50, all of which are associated with their respective attribute values stored therein. More specifically, the animation part ID 40 stores part IDs 1 to 7 of the animation parts 28-1 to 28-7 stored in the part table 28 of FIGS. 4A and 4B. The character ID 42 is indicative of the type of the character, and in this instance it is the same character ID=001 for all the part IDs. The expression 44 is the expression of the face in each animation part, and in this example it stores as its attribute values "serious look", "smiling face", "angry look" and "sad look". The state of mouth 46 is representative of a motion of the mouth in each animation part and it stores "uttering" and "shut" as its attribute values. The state of eyes 48 is indicative of a motion of eyes and it stores "open", "blinking" and "closed". Furthermore, the direction of face 50 includes "front" "right-hand side" "left-hand side" "upward" and "downward", and in this example it stores "front" as its attribute value.

Referring again to FIGS. 4A and 4B, in the case of creating an animation work by use of the animation creating apparatus of the present invention, the user enters a story of animations through the entry unit 12. This story consists of a plurality of proceeding steps, at each of which attribute values are entered. In the entry unit 12 of FIG. 4B for example, the attribute values "serious look" and "uttering" are entered at a story step I, the attribute values "angry look" and "uttering" are entered at a story step II, the attribute values "serious look" "mouth shut" and "blinking" are entered at a story step III, and the attribute values "smiling face" and "uttering" are entered at a story step IV.

FIG. 6 shows an example of the story entry effected through the entry unit 12 by the user, in which the user entered attribute values on a plurality of items are placed in a story entry table 52 on a story step basis. The story steps I and II in the story entry table 52 have as an attribute value entry 56 attribute values on all the items including the character ID 42, the expression 44, the state of mouth 46, the state of eyes 48 and the direction of face 50.

FIG. 7 shows another example of the story entry table 52 obtained by the other story entry though the entry unit 12. In the case of this story entry, there are entered only attribute items which have changed from the preceding step among the plurality of attribute items. More specifically, in the story step I the attribute value entry 56 includes all the items from the character ID 42 to the direction of face 50, although in the next story step II the attribute value entry 56 is associated with only the expression 44. By entering only the attribute values which have changed from the preceding story step in this manner, it is possible to simplify the entry of story by the user in the creation of animations.

Referring again to FIGS. 4A and 4B, the animation part selection processing unit 22 provided in the arithmetic unit 14 of FIG. 3 retrieves the animation data base 16 on the basis of entry of attribute values in each story proceeding step I, II, . . . by the story entry through the entry unit 12. Then the unit 22 selects animation parts satisfying the entered attribute values from the data base 16 and links them together to store, as the selection result, part IDs in the sequence of, e.g., ID1, ID5, ID2, ID3, . . . into the animation sequence 32. The animation sequence 32 is read out by the reproduction processing effected by the animation composite unit 26 provided in the arithmetic unit 14 of FIG. 3 so that based on part IDs in the animation sequence 32, corresponding animation parts 28 are read out from the animation data base 16 and are successively output displayed on the display unit 20 to thereby reproduce a series of created animations.

FIG. 8 is a flowchart of creation processing effected by the animation creating apparatus 10 of FIG. 3. First, in step S1, retrieval conditions are initialized, and in step S2, attribute values entered by the user in the current story step are read and are stored into the story entry table 52 as shown in FIG. 6 or FIG. 7. Then, in step S3, a check is made to see if the attribute values entered in the current story step have been entered on all the items. In the case where all the items of the attribute values have been entered as in FIG. 6, the procedure goes to step S4 in which each attribute value is set to the retrieval conditions. On the contrary, in the case where all the items of the attribute values have not been entered as in FIG. 7, the procedure goes to step S5 in which only the entered items of attribute values are replaced by the retrieval conditions in the preceding story step. Then, in step S6, an animation part ID corresponding to the attribute value of the set retrieval condition is read from the animation data base 16, and in step S7, the thus retrieved animation part ID is added to the animation sequence 32 of the output file 18. Then, in step S8, if any story remains, the procedure goes back to step S2 in which attribute values in the next story step are read to repeat similar retrieval processing of the animation parts. If no story remains in step S8, a series of animation creating processing comes to an end. According to the animation creating apparatus of the present invention in this manner, not only the animation parts of a segmented character but also the attribute values representative of features of the action and expression of each part are stored as data base so that animation parts are selected and linked together for each proceeding step of the story, thereby achieving smooth variations in the actions and motions of the character in accordance with the story entered by the attribute values, to make it possible to simply edit an animation work with a high quality using animation parts.

Description will then be made of another embodiment in which attribute values distinguishing repetitive animations from non-repetitive animations are used as the attribute values of the animation parts. In the character animations created by the animation creating apparatus of the present invention, there may take place repetitions of the same actions such as motions of the mouth upon the uttering or motions of the eyes upon the blinking. Or reversely, there may be a single regeneration of animation parts without any repetition when the expression changes or the direction of the face changes. Thus, this embodiment separates the animation parts in the animation data base 16 into I. repetitive animations II. non-repetitive animations for creations and makes it possible to separately designate the repetitive animations or the non-repetitive animations as the attribute values of the story entry. By enabling the repetitive animations of the animation parts to be designated as attribute values in this manner, there can be created a scene in which the same animation parts are repetitively reproduced, by designating the number of repetition by the story entry, thereby achieving a reduction in the amount of data in the data base of the animation parts.

Figure 9:
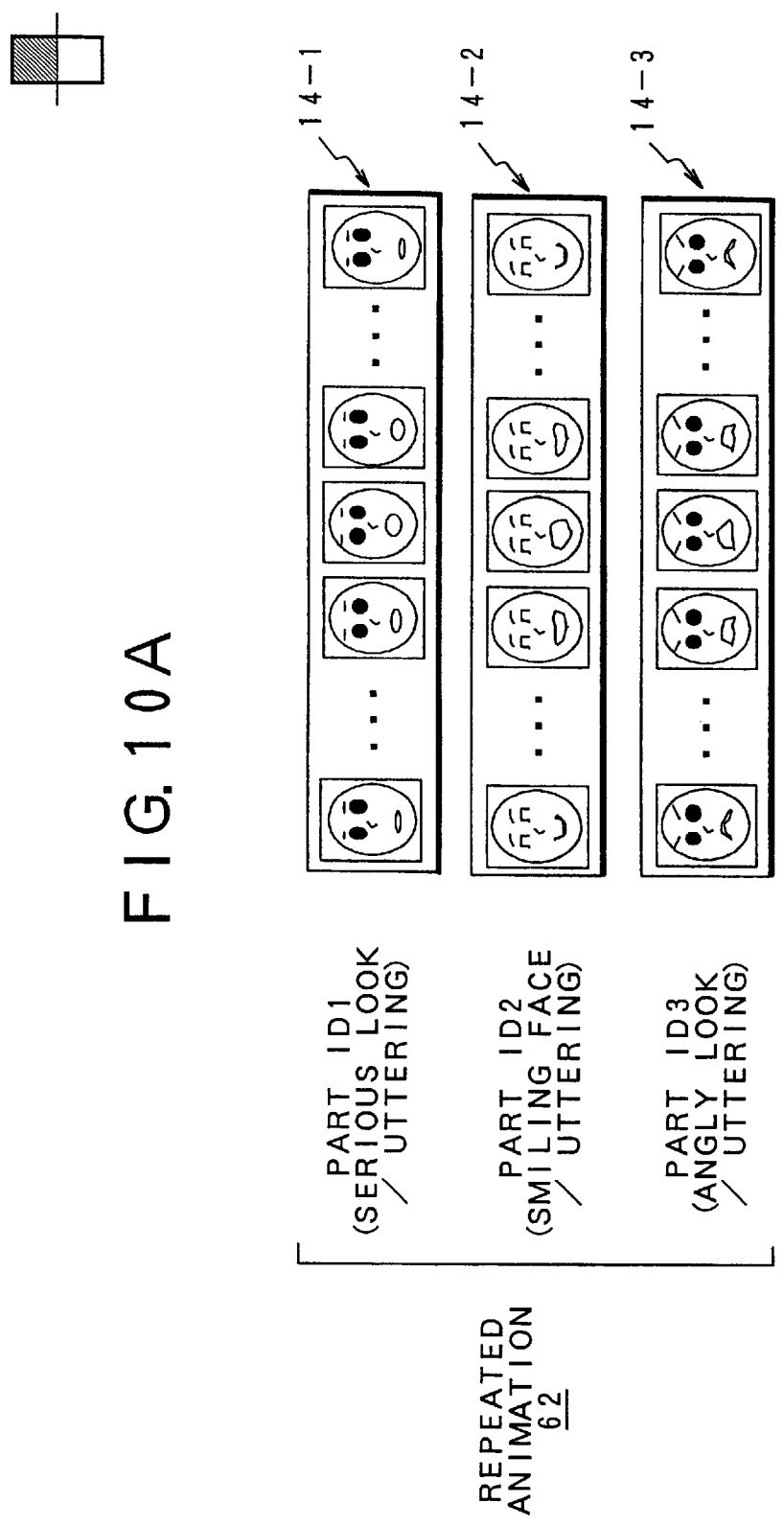
FIGS. 9A, 9B and 9C are explanatory diagrams of the attribute data table in which repetitive and non-repetitive animation parts are stored.

FIGS. 9A, 9B and 9C are explanatory diagrams of an attribute data table 30 allowing a designation of the repetitive animations or the non-repetitive animations as the attribute values. This attribute data table 30 is provided additionally with a repetition 60 as the attribute items 36 such that an attribute value "permitted" is given to the repetitive animation parts but "prohibited" is given to the non-repetitive animation parts as the attribute values 38. The attribute items 36 further include the expression of the face, the state of mouth, the state of eyes and the direction of the face, of each of which attribute values at the first frame (foremost frame), at the final frame and in animation are stored.

FIGS. 10A and 10B are explanatory diagrams of animation parts corresponding to the attribute value table 30 of FIGS. 9A, 9B and 9C. Animation parts 14-1 to 14-3 of FIGS. 10A and 10B belong to a repetitive animation 62. On the contrary, animation parts 14-4 to 14-9 belong to a non-repetitive animation 64. The animation parts 14-1 to 14-3 of the repetitive animation 62 have the same attribute values, in the expression, the states of eyes and mouth, and direction of face, at the respective first frames and at the respective final frames. In contrast with this, the animation parts 14-4 to 14-9 of the non-repetitive animation 64 have different attribute values, in the expression, the states of eyes and mouth, and the direction of face, at the respective first frames and at the respective final frames. Furthermore, as the expression in animation 44-3 in the attribute data table 30 of FIGS. 9A, 9B and 9C, the animation parts 14-4 to 14-9 of the non-repetitive animation 64 store therein a variation in the expression in which the attribute values change from "serious look" to "smiling face", in the case of the animation part 14-4 of the part ID4 for example.

The reason why the attribute values at the first and final frames have been stored of the expression, the states of eyes and mouth, and the direction of face is to judge the continuity of animation parts selected by the attribute values entered in each story step. In cases where for example animation parts selected by attribute values entered in a story step are connected to animation parts entered in the next story step, the attribute values of the expression, the states of eyes and mouth, and the direction of face at the final frame of a first animation part must be equal to the attribute values of the expression, the states of eyes and mouth, and the direction of face at the first frame of the next animation part. In order to judge whether they are equal to each other or not, use is made of the attribute values at the first frame and at the final frame.

By storing the attribute data table 30 of FIGS. 9A, 9B and 9C and the animation parts 14-1 to 14-9 of FIGS. 10A and 10B into the animation data base 16 of FIG. 3, it is possible for the animation creating apparatus 10 of the present invention to implement the creation processing by means of the entry unit 12 and the arithmetic unit 14. In this case, if the repetitive animation is designated as the attribute values, the number of repetition n must be entered for designation.

Figure 11:
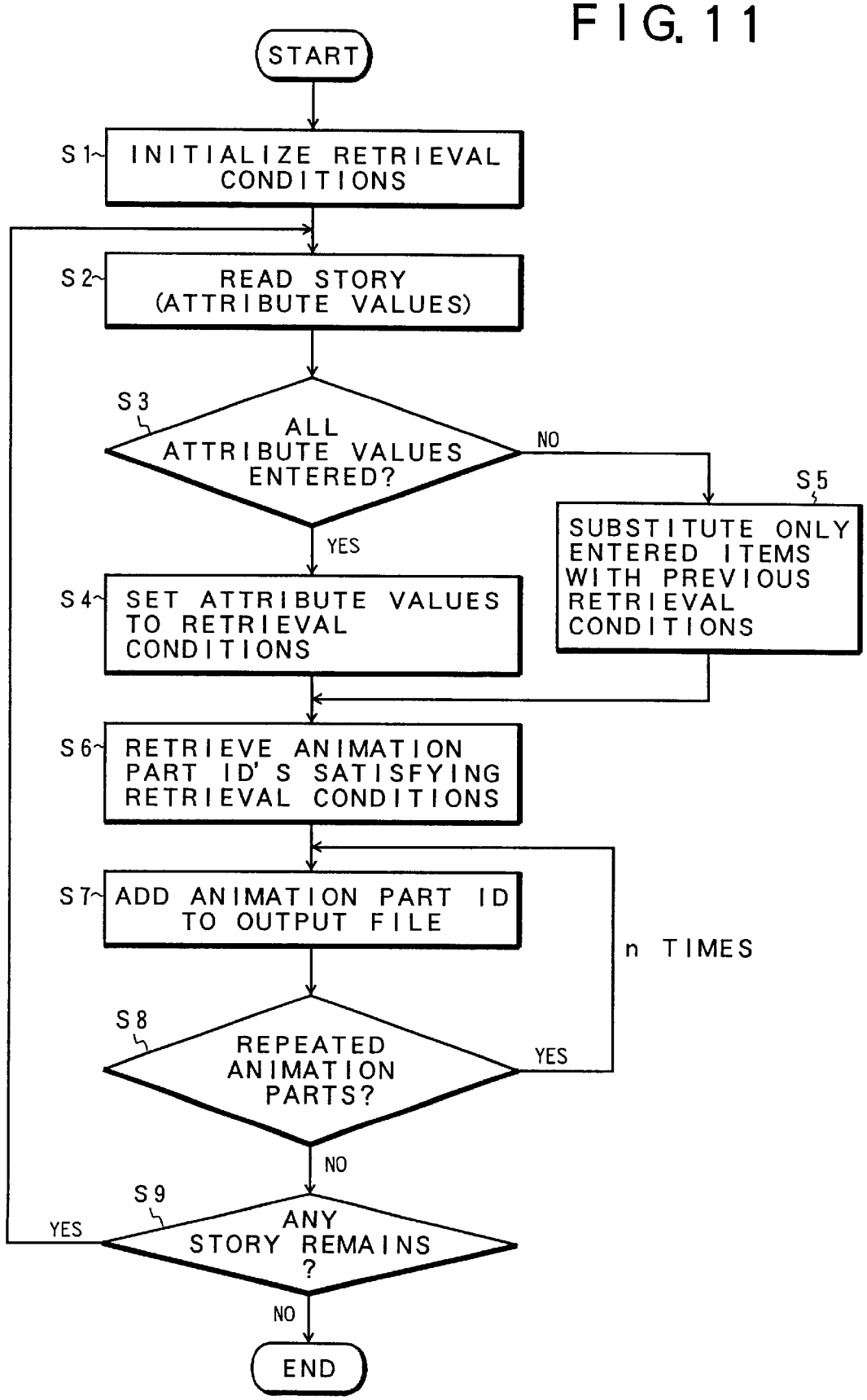
FIG. 11 is a flowchart of animation creating processing of the present invention using the repetitive and non-repetitive animation parts of FIGS. 9A, 9B and 9C.

FIG. 11 is a flowchart of character creating processing effected in accordance with the present invention in the case where the repetition animation and the number of repetition n have been designated as the attribute values of the story entry. First, in step S1, retrieval conditions are initialized, and thereafter in step S2, attribute values entered in the current story step are read in. If the entry of an attribute value designating a repetitive animation is completed by that time, then read-in of the simultaneously designated number of repetition n is carried out. Subsequently, in step S3, a check is made to see if all attribute values in the current story step have been entered or not. If all the attribute values are entered, then in step S4 the attribute values are set to retrieval conditions. If only the changed attribute values are entered, then in step S5 the attribute values of the entered items are replaced with the preceding retrieval conditions. Then, in step S6, animation part IDs corresponding to the set retrieval conditions are retrieved from the animation data base 16, and in step S7, the thus retrieved animation part IDs are added to the animation sequence 32 in the output file 18. Then, in step S8, it is judged whether they are repetitive animation parts or not. If they are repetitive animation parts, then the addition of the animation part IDs to the animation sequence 32 in the output file 18 in step S7 is repeated by the number of times n designated together with the entry of the attribute values. Such processing of steps S1 to S8 is repeated until the completion of the story in step S9.

Description will then be made of animation part reselection processing which automatically renders into a good continuity the discontinuity of the animation parts in the case of using, by the entry of the attribute values, the repetitive animation parts and the non-repetitive animation parts of FIGS. 9A, 9B and 9C and FIGS. 10A and 10B.

Figure 10:
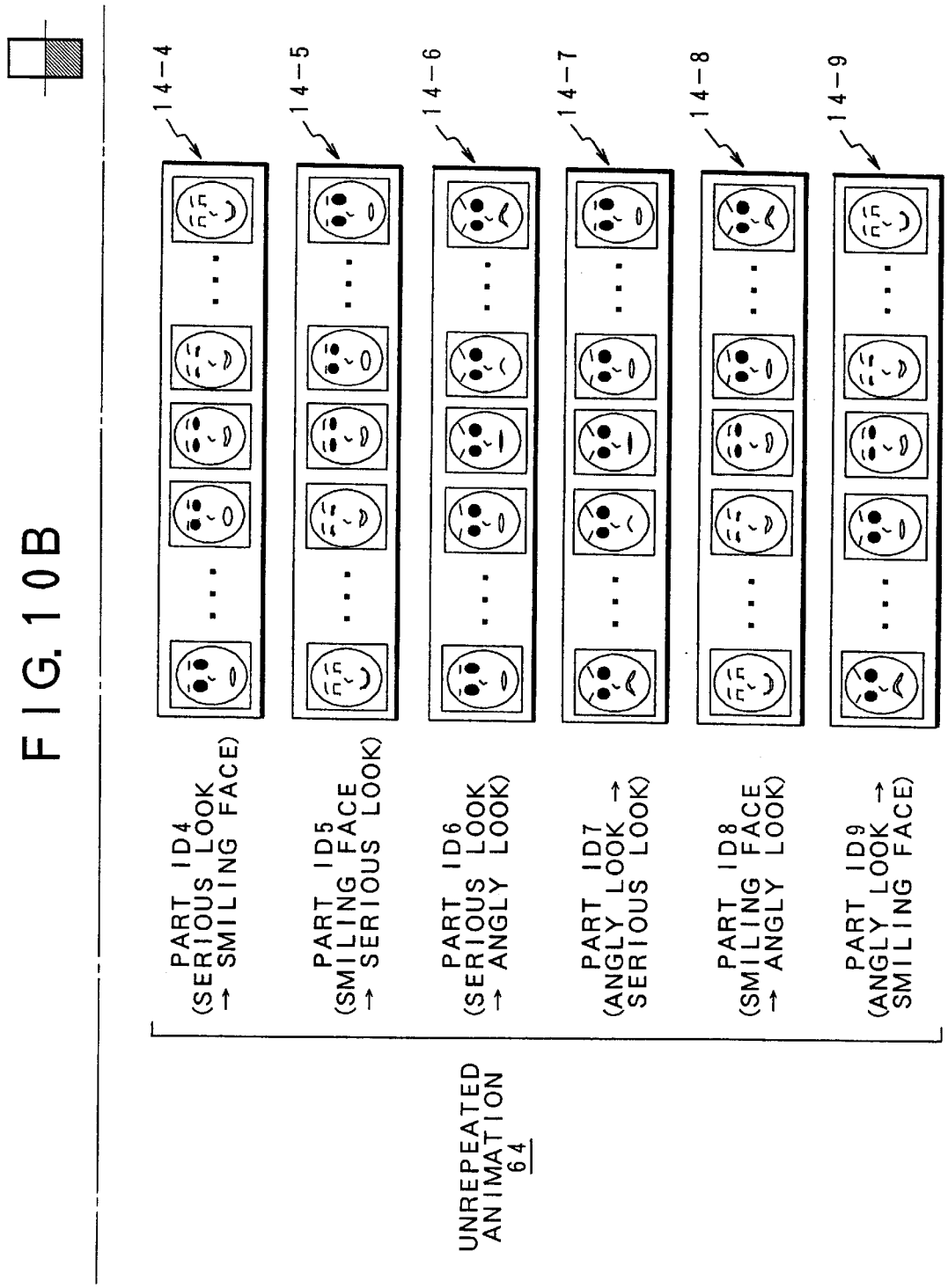
FIGS. 10A and 10B are explanatory diagrams of animation parts corresponding to the attribute data table of FIGS. 9A, 9B and 9C.
Figure 12B:
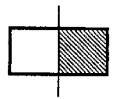

FIGS. 12A and 12B illustrate an example of the story entry table 52 in the story steps I and II with designated attribute values of the repetitive animation parts and the non-repetitive animation parts. In the case of this story entry table 52, if an animation part of FIG. 10 is selected by the attribute value entered in the story step I, then an animation part 14-1 having the part ID1 is selected. Furthermore, if an animation part of FIG. 10 is selected by the attribute value entered in the story step II, then an animation part 14-3 having the part ID3 is selected. If the animation parts 14-1 and 14-3 retrieved through the attribute entry in the story steps I and II are intactly connected to each other, then an animation results which abruptly changes from "serious look" at the final frame of the animation part 14-1 to "angry look" at the first frame of the animation part 14-3. This can be confirmed from the attribute values stored in the story entry table 52 of FIG. 12. Arrows of the attribute values extending from the story step I to the story step II of FIGS. 12A and 12B represent changes in states upon the connectsion of animations. In order to ensure a good connectivity between the animation parts, the attribute values of the expression, the states of eyes and mouth, and the direction of face at the final frame of the story step I must be equal respectively to those at the first frame of the next story step II. In the example of FIG. 12, however, the attribute values of the expression of face are different from each other in that the attribute value "serious look" in the expression at the final frame 44-2 in the story step I is followed by the attribute value "angry look" in the expression at the first frame 44-1 in the next story step II. In order to deal with such a difference of the attribute values in the connection of the story steps I and II, the present invention changes the attribute values so as to automatically obtain the same attribute values, to thereby perform reselection of the animation parts.

Figure 13A:
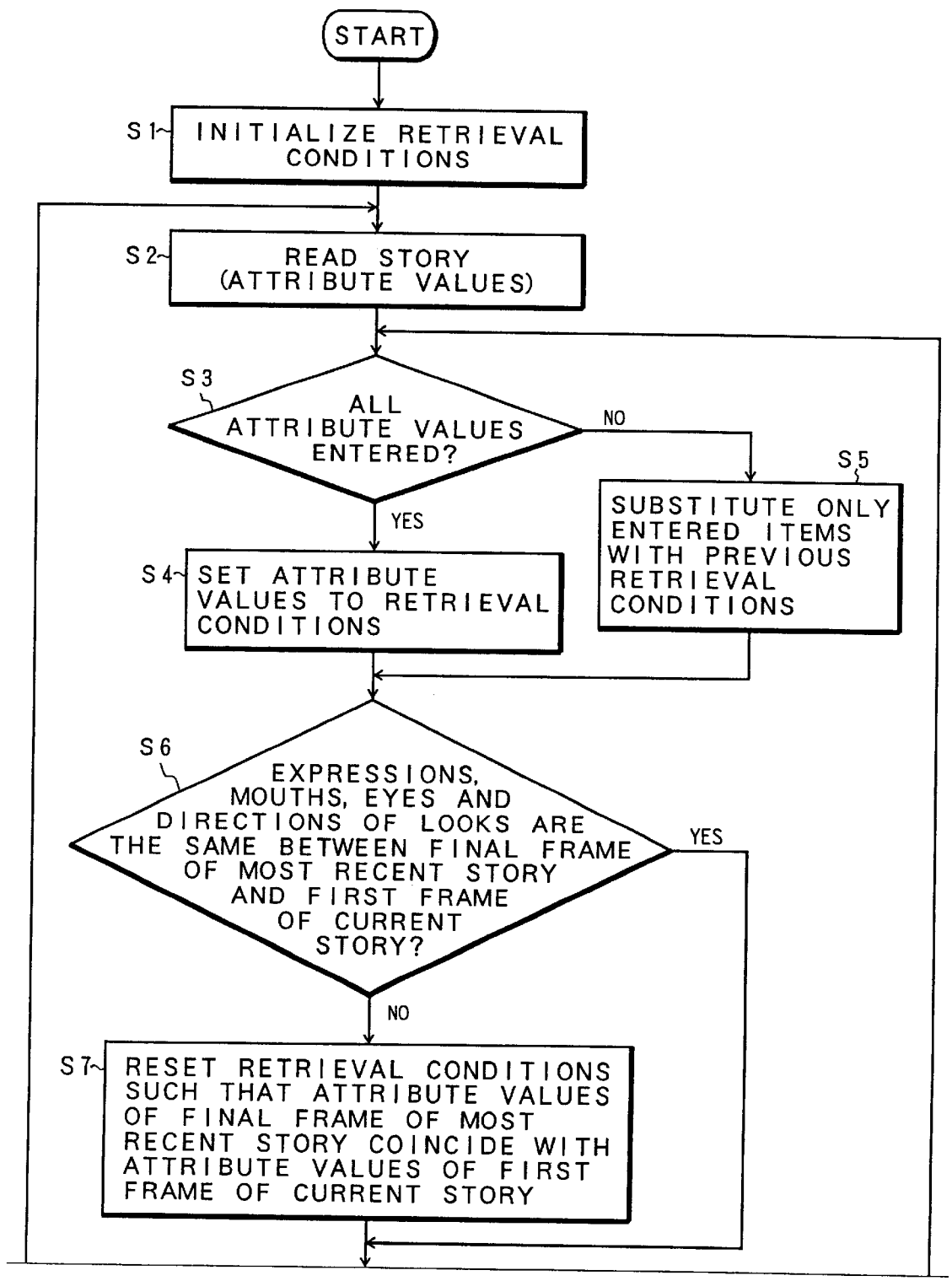

FIGS. 13A and 13B are flowcharts of the animation creating processing for judging whether the connectivity of the animation parts as in FIGS. 12A and 12B is good or poor, and for improving the connectivity if poor connectivity is judged. First, in step S1, retrieval conditions are initialized, and in step S2, attributes values entered in the current story step are read in. If it is judged in step S3 that all the attribute values have been entered, then they are set to the retrieval conditions in step S4. Otherwise, if it is judged that only the attribute values of the changed portions have been entered, the changed attribute values are replaced with the preceding retrieval conditions in step S5. Then, in step S6, a check is made to see if the attribute values of the expression of face, the states of eyes and mouth, and the direction of face at the final step in the preceding story step are equal respectively to those at the first frame in the current story step. If at that time the two attribute values of the expression for example are not coincident with each other since they are "serious look" and "angry look", respectively, as in FIG. 12, procedure goes to step S7 in which the retrieval conditions are reset so that the attribute value "serious look" at the final frame in the preceding story step I results in the attribute value "angry look" at the first frame in the current story step II. For example, the attribute values of the expression of FIGS. 12A and 12B are changed as indicated by arrows in the story entry table 52-1, and the retrieval conditions of the preceding story step I are reset. Then, in step S8, animation part IDs satisfying the retrieval conditions are retrieved. At that time, in case resetting of the retrieval conditions has been performed on the basis of the judgment of discontinuity in step S7, re-retrieval of the animation part IDs based on the preceding retrieval conditions will be carried out. In the case of FIG. 12, the non-coincident attribute value "serious look" in the preceding story step I is reset to the attribute value "angry look", and when reselection is made of an animation part ID corresponding to the story step I on the basis of the post-resetting retrieval conditions, an animation part 14-6 of the part ID6 of FIGS. 10A and 10B is retrieved. The animation part ID6 has the attribute value "angry look" at the final frame, which coincides with the attribute value "angry look" at the first frame in the next story step II. In addition to the coincidence of the attribute values of the expression, the attribute values of the states of eyes and mouth and of the direction of face are also coincident with each other so that the continuity of the animation parts is automatically achieved by the resetting of the retrieval conditions. Naturally, if continuity is judged in step S6, the processing of step S7 is skipped, and the animation part ID is retrieved in step S8 and the thus retrieved animation part ID is added to the animation sequence in the output file in step S9. Then, in step S10, in the same manner as the case of FIG. 11, a check is made to see if it is the repetitive animation part or not, and if it is the animation part, then there is repeated, by n-times designated by the entry, the step S9 in which the animation part ID is added to the animation sequence in the output file. Then, in step S11, a check is made to see if the animation has automatically been reselected for the improvement in connectivity. If a poor connectivity is judged in step S6 and resetting of the retrieval conditions is performed in step S7 and automatic reselection of the animations to be connected is carried out in steps S8 and S9, then the attribute values are restored to the attribute values before the automatic connection in step S13 since at that time the retrieval processing returns to the preceding story step. That is, in the case of FIG. 12, the processing in the current story step II is returned to the attribute values in the preceding story step I, allowing the procedure to go back to step S3 to again perform the processing from the story step II. If the animations to be connected are not automatically selected in step S11, then the procedure goes to step S12 and repeats the processings from the step S2 until the story terminates. In this manner, even in the case where a smooth change in the actions or in the expression is not achieved due to poor connectivity of the two adjoining animation parts, selection of animation parts is made to automatically ensure a good connectivity and a smooth change. Thus, even though there exists a discontinuity in the entry of a story by the attribute values, an automatic selection is achieved of the animation parts having a good connectivity, thereby making it possible to remarkably reduce the burden on the editing work and to enhance the quality of the animation work.

Description will then be made of an embodiment of the case where impression data are added to the attribute data in the animation data base of the present invention.

In a creating work using the animation creating apparatus of FIG. 3, when impression data are added to the attribute data table 30 in the animation data base 16, the user specifies an impression of an animation to be created so that animation parts corresponding to the thus specified impression are retrieved to ensure that the impression of the finished animation coincides with the specified impression. Furthermore, the entry of impression data in the form of attribute values makes it possible to simplify the entry of attribute values by the user upon the creation of animation.

FIG. 14 shows by way of example the impression data stored in the attribute data table 30 in the animation data base 16, illustrating a distribution of the animation parts in the two-dimensional impression coordinate space. In this two-dimensional impression coordinate space, terms representative of impression are applied as normalized numerical value information to the x-axis and y-axis. As to the impression of a character, the positive and negative sides of the x-axis represent a strong impression and a weak impression, respectively, while the positive and negative sides of the y-axis represent a warm impression and a cold impression, respectively. The placement of the character parts in this two-dimensional impression space is made by determining the respective coordinate values on the x-axis and y-axis by means of the subjective evaluation method for example. For this reason, with respect to parts ID1 to ID12 placed in the two-dimensional impression coordinate space, it is possible to determine the distance in the impression space between the mutual animation parts by using the respective coordinate values as well as each coordinate value. A closer distance between the animation parts results in a more resemblant impression, whereas a farther distance therebetween results in a more different impression.

FIG. 15 shows by way of example the attribute data table 30 in which coordinate values (x, y) are stored as impression data in the two-dimensional impression coordinate space of FIG. 14. This attribute data table 30 further stores therein impression x values 72 and impression y values as coordinate values in the impression space of FIG. 14, in addition to the direction of face 50 in the attribute items 36 shown in FIG. 5, for each animation part ID. This attribute data table 30 is stored in the animation data base 16 of the animation creating apparatus 10 so that an animation using the impression data as entry values of the attribute values can be created.

FIG. 16 shows an example of a story entry table 52 obtained by the entry of a story using the impression data set in the impression coordinate space of FIG. 14. In the story step I "serious look" is entered as the attribute value of the expression 44, whereas in the next story step II "closest point" is entered as impression data in the impression space. The impression data "closest point" is an impression distance condition in the impression coordinate space corresponding to the attribute value "serious look" of the expression 44 entered in the preceding story step I. In the case where the "closest point", one of the impression distance conditions, has been entered as the impression data, a closest animation part in the impression coordinate space of FIG. 14 is specified of the animation parts selected by the attribute values in the story step I. Selection of an animation part closest to the preceding animation part in this case is figured out from the distance represented by the coordinate values (x, y) in the impression coordinate space of the corresponding animation part of FIG. 15.

Figure 17B:
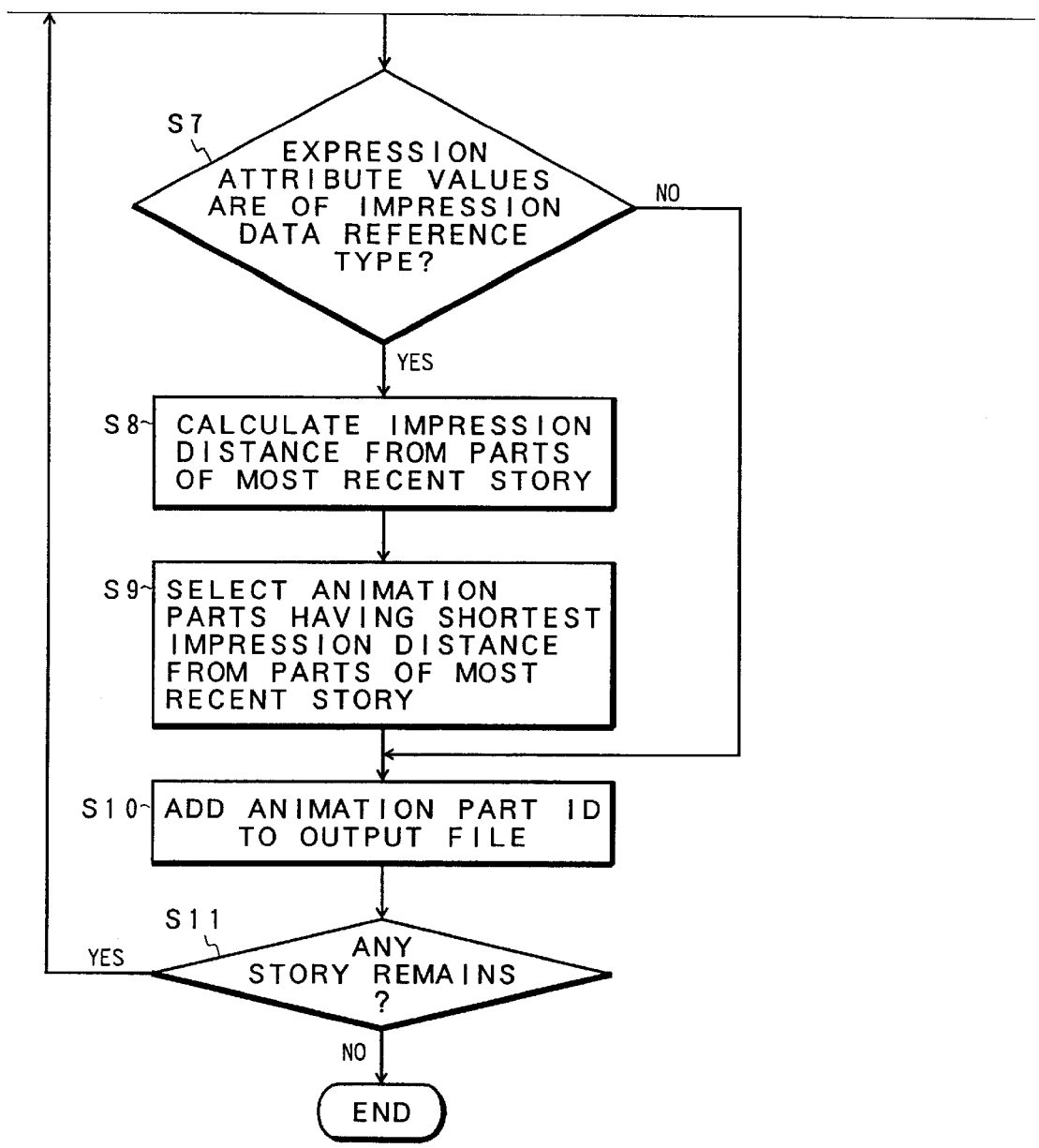
FIG. 17 is a flowchart of the animation creating processing of the present invention using the impression data of FIG. 16.

FIGS. 17A and 17B are flowcharts of animation creating processing to be effected when the impression distance condition "closest point" has been entered as the impression data as in FIG. 16. In step S1, the retrieval condition is initialized, after which in step S2, an attribute value entered in the current story step is read in. In the case of using the impression data at that time, the impression distance condition "closest point" in the impression space is entered as the attribute value of the expression 44 as in the story step II of FIG. 16. Then, if it is judged in step S3 that all attribute values have been entered, the procedure goes to step S4 in which if it is the entry of the attribute value of the changed portion, the processing is made in step S5. Then in step S6, retrieval is made of an animation part satisfying the retrieval condition by the entry of the attribute value. Herein, in case the impression distance condition "closest point" in the impression data for the expression 44 has been entered as the attribute value as in the story step II of FIG. 16, due to no designation of the attribute value of the expression 44, retrieval of the animation part is carried out on the basis of the other attribute values than this attribute value of this expression 44, that is, on the basis of the attribute values of the state of mouth and eyes and the direction of face. As a result, a plurality of animation parts are retrieved as candidates in step S6. Then in step S7, a check is made to see if the attribute value of the expression 44 is of an impression data reference type or not. If it is of the impression data reference type, then in step S8 calculation is made of impression distances between the plurality of animation part candidates being retrieved in the step S6 in the case of the impression data reference type, and the animation part in the preceding story step, on the basis of coordinate values in the respective impression spaces. Then in step S9, selection is made of an animation part having a shortest impression distance from the animation part in the preceding story step, on the basis of the "closest point", impression distance condition being entered at that time. Then in step S10, the ID of the thus selected animation part is added to the animation sequence of the output file, and thereafter in step S11 the same processing is repeated until the story is complete. Although in this case the impression distance condition entered as impression data has been the "closest point" by way of example, "farthest point", "second closest point", etc., could instead be entered as other designations of the impression distance condition.

Figure 18:
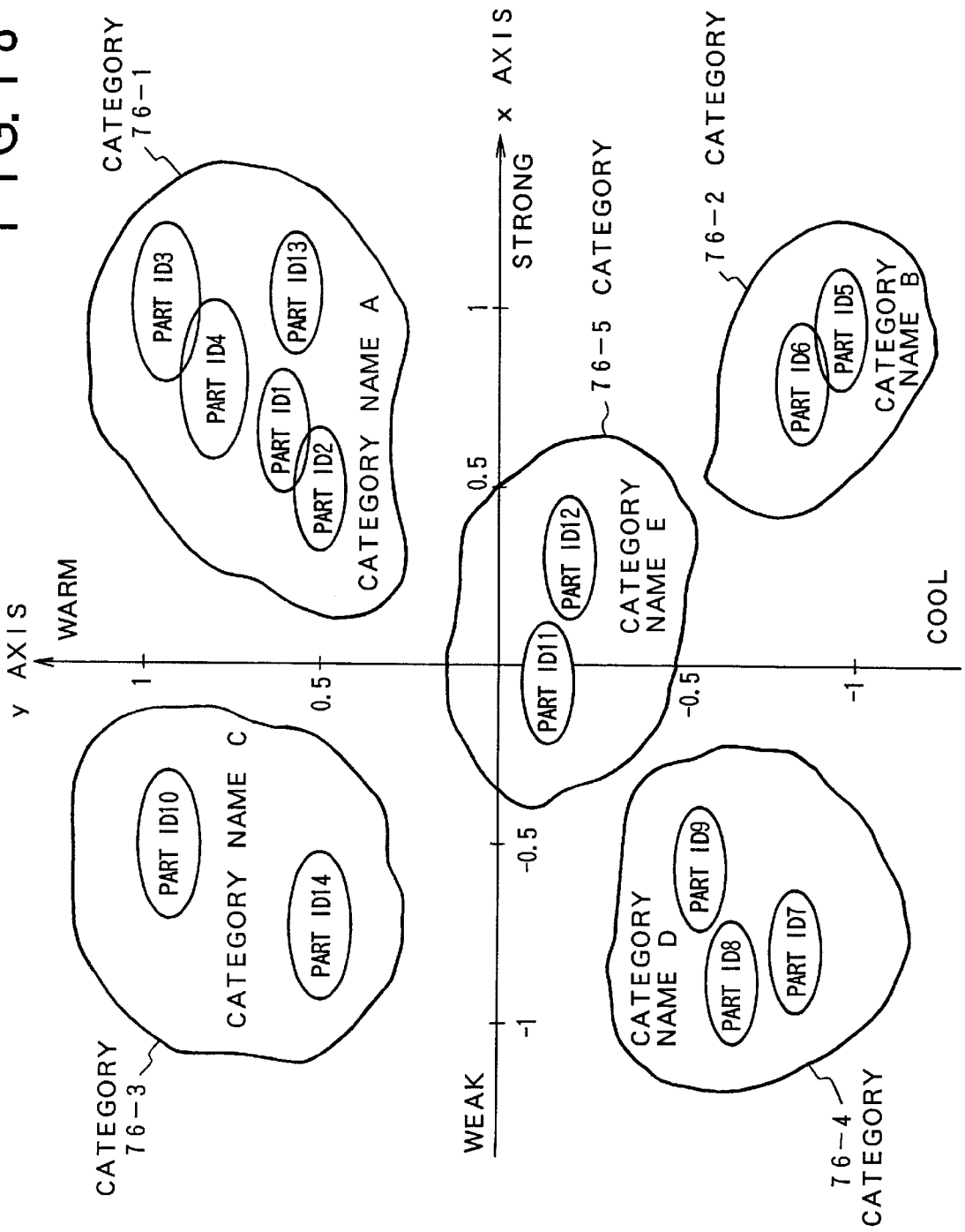
FIG. 18 is an explanatory diagram of the impression coordinate space in which categories of the impression data are defined.

FIG. 18 shows an embodiment of the other type of impression data in the case where the impression data are added as attribute values of the animation data base. In this two-dimensional impression coordinate space, as to the expression of face, x-axis represents the intensity of impression, i.e., weak or strong whereas y-axis represents warmness or coldness of the impression in the same manner as FIG. 14. In this embodiment, categories 76-1 to 76-5 are defined as impression regions in the impression coordinate space. The categories 76-1 to 76-5 are regions which gather together impressions a character gives in accordance with the subjective evaluation method. The categories 76-1 to 76-5 have the following impression for example.

I. Category 76-1: category representative of happy feeling

II. Category 76-2: category representative of cold feeling

III. Category 76-3: category representative of modest and gentle feeling

IV. Category 76-4: category representative of sad feeling

V. Category 76-5: category representative of calm feeling

Category names A to E are assigned to these categories 76-1 to 76-5, respectively.

FIG. 19 is an example of the attribute data table 30 in which categories in the impression space of FIG. 18 have been added to the attribute values. This attribute data table 30 further includes, as the attribute items 36, a category name 76 which stores category names A, B, D, etc., to which animation parts belong in the two-dimensional impression coordinate space of FIG. 18, in a manner corresponding to the parts IDs 1 to 7 of the animation part ID 40.

FIG. 20 shows by way of example the story entry table 52 which has been obtained by the entry of attribute values into the animation creating apparatus 10 of FIG. 3 in which the animation data table 16 stores the attribute data table 30 having the category names 76 in the impression space added thereto as in FIG. 19. In the case of this story entry table 52, as to the attribute value of the expression 44, the attribute value "serious look" is entered in the story step I whereas in the next story step II "same category" is set as the impression data using the categories as the impression data which have been defined in the two-dimensional impression space of FIG. 18. As used herein, the "same category" means that designated in the story step II is an animation part belonging to the same category as the category to which the animation part selected by the entry of attribute value in the story step I belongs. More specifically, upon the retrieval of the animation data base in the story step II, selection is made of an animation part using attribute values of the other expression of mouth, state of eyes and direction of face than those set by the impression data "same category", whereby an animation part satisfying the impression data "same category" is selected from the thus selected plurality of animation part candidates. In the case of the category 76-1 of FIG. 18 for example, when an animation part of the part ID 1 is selected in the story step I, designation of the "same category" in the next story step II results in the selection of a plurality of animation parts belong to the category 76-1. In cases where the plurality of animation parts have been selected by the designation of the impression data "same category", a single animation part is selected in accordance with one of the following.

I. Select one animation part at random within the same category.
II. Describe priorities, as attribute data, on animation parts contained in the same category and select one animation part in accordance with the priorities.

FIGS. 21A and 21B are flowcharts of the creation processing effected when an animation part is selected at random by setting categories in the impression space of FIG. 18 as the attribute values. In step S1, the retrieval condition is initialized and then in step S2, upon the read of the attribute value entered in the current story step, "same category", category data utilizing the category name in the impression coordinate space of FIG. 18 is entered in place of the attribute value of the expression 44, as in the story step II of FIG. 20 for example. In step S3, if all the attribute values are entered, the retrieval conditions are set in step S4, whereas if only the changed attribute values are entered, the retrieval conditions are set in step S5. Then in step S6, retrieval is made of animation parts satisfying the retrieval conditions set to the entered attribute values. In case the impression data "same category" are set without designating the attribute value of the expression 44 at that time as in the story step II of FIG. 20, retrieval is made of the animation parts corresponding to the other attribute values than those, that is, to the other states of mouth and eyes and direction of face, whereby a plurality of animation parts are retrieved as candidates. Then in step S7, a check is made to see if the attribute value of the expression is of the impression category data reference type or not. If it is of the impression category data reference type, the procedure goes to step S8 in which a single animation part is selected at random from the category to which the animation parts selected in the preceding story step belong. Then in step S9, the ID of the thus selected animation part is added to the animation sequence in the output file, and in step S10, the processing from the step S2 is repeated until the story is complete.

FIG. 22 is an explanatory diagram of the attribute data table 30 which stores therein priorities for selecting one from a plurality of animation parts belonging to the same category, in accordance with the priorities, when a category in the impression space of FIG. 18 is designated. In addition to the category name 76 of FIG. 19, this attribute data table 30 further includes, as the attribute items 36, a priority 80 defined for animation parts belonging to the same category name. Four animation parts of the animation part ID40=IDs 1 to 4 for example are given the same category A as the category name 76, with the priorities 1, 3, 2 and 4 as the priorities 80 being allocated to the part IDs 1, 2, 3 and 4, respectively.

Figure 23A:
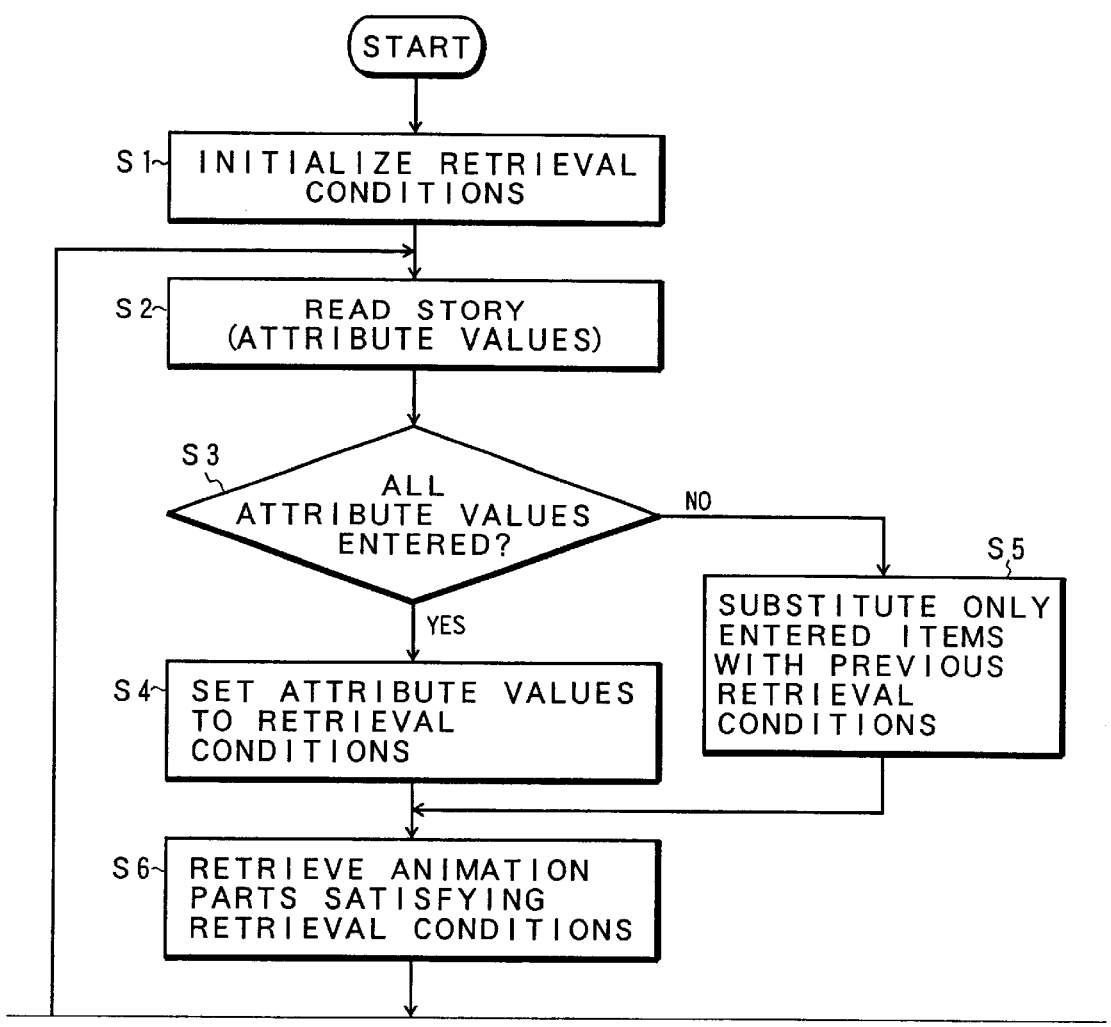

FIGS. 23A and 23B are flowcharts of the animation creating processing of the present invention effected when the priorities are assigned to the animation parts belonging to the same impression category 2 of FIG. 22. Steps S1 to S7 are substantially the same as those in the random selection of FIG. 21, although in the processing of step S8 in the case where the impression category data reference type has been judged in step S7, an animation part with a highest priority is selected from retrieved animation parts belonging to the category to which the animation parts selected in the preceding story step belong. Then in step S9, the ID of the thus selected animation part is added to the animation sequence in the output file, and in step S10, the above processing is repeated until the story terminates. By entering impression data belonging to the same impression category as defined in the two-dimensional impression space as in FIG. 18 in this manner, it is possible to assure that impression of the finished animation coincides with the impression entered by the user. Furthermore, utilization of the impression data makes it possible to simplify the entry of the attribute values.

Although in the above embodiment the description has been of the case by way of example where animation parts of the expression of a person are created so that they are linked together through the selection by the entry of the attribute values to form an animation, animation parts of the action of a person may similarly be created as the character type animation so that an animation is formed through the entry of the attribute values.

Other characters having the expression of face, the eyes, mouth and nose than the person can be not only animal characters but also appropriately personified characters.

The present invention further provides a record medium in which is stored an animation creating program for implementing the functions of the character creating apparatus shown in the above embodiments. This record medium can be for example a removal, transportable record medium such as a CD-ROM or a floppy disk, a storage device for a program provider who provides the character creating program of the present invention through a line, or a memory device such as a RAM or a hard disk of the processor having the character creating program of the present invention installed therein.

The animation creating program of the present invention provided by the record medium is loaded into a processor such as a personal computer or a workstation to run on its main memory.

It will be appreciated that the present invention includes appropriate variants insofar as they do not impair the objects and advantages thereof and that the present invention is not limited by the numerical values of the above embodiments.

As set forth hereinabove, the present invention stores as data base the attribute values indicative of features of the actions and expression of each part in addition to the animation parts of a character and allows entry of desired attribute values in each proceeding step of a story to select the animation parts and link them together, thereby ensuring smooth variations of the actions, expression, etc., in accordance with the story entered as the attribute values, to achieve a simple editing of a high-quality animation using the animation parts.

It is also possible to designate as the animation parts the repetitive animation and the non-repetitive animation through the entry of the attribute values, thereby enabling the amount of storage in the data base for the repetitive animation to be reduced. Connectivity upon the selection of animation parts through the entry of attributes is also judged, and if the connectivity is poor, the attribute values are automatically reset so that the animation parts are reselected, thereby automatically modifying the connectivity to ensure a simple creation of a high-quality animation without requiring a work burden to edit.

Furthermore, impression data such as coordinate values and categories in the impression coordinate space are stored as the attribute values for the entry of a story so that the impression data are used for the entry of the story, thereby making it possible for the user to designate the impression of an animation to be created such as warmness or sadness, to assure that the finished animation work come to have a designated impression in its entirety.

What is claimed is:

1. An animation creating apparatus comprising:
a storage unit storing animation parts indicative of a series of actions and expressions of a person divided into a plurality of frames and storing attribute values of said animation parts;
an entry unit entering said animation part attribute values in accordance with proceeding of a story; and
an arithmetic unit selecting animation parts from said storage unit using said animation part attribute values entered through said entry unit, said arithmetic unit linking thus selected said animation parts together to create an animation in conformity with said story,
wherein said storage unit stores attribute values of the foremost frame and the endmost frame, of said plurality of frames providing said animated parts, and
wherein upon the selection of animation parts from said storage unit, said arithmetic unit judges whether connectivity of animation parts is good or poor on the basis of attribute values in the current step and in the preceding step, said arithmetic unit, when poor connectively is judged, changing the attribute value to reselect another animation part for better connectivity.

2. An apparatus according to claim 1, wherein
said storage unit stores, as said animation part attribute values, attribute values comprising at least one of a character ID, an expression of a face, a state of a mouth, a state of eyes and a direction of the face.

3. An apparatus according to claim 1, wherein
said storage unit stores attribute values distinguishing repetitive animation parts which appear repetitively by the designated number of times, from non-repetitive animation parts which appear only once.

4. An apparatus according to claim 1, wherein
said entry unit enters all attribute values consisting of a plurality of items in each proceeding step of said story.

5. An apparatus according to claim 1, wherein
said entry unit enters only attribute values which have changed from the preceding step in each proceeding step of said story.

6. An apparatus according to claim 1, wherein
upon the selection of animation parts from said storage unit, said arithmetic unit compares an attribute value at the foremost frame in the current step with an attribute value at the endmost frame in the preceding step, said arithmetic unit, when non-coincidence is detected, judging the connectivity of animation parts to be defective and changing the attribute value at the endmost frame in the preceding step into the attribute value at the foremost frame in the current step to thereby reselect another animation part.

7. An apparatus according to claim 1, wherein
said storage unit stores, as impression data, coordinate values in a predetermined impression coordinate space, of a specific attribute value of said animation part; and wherein said entry unit enters, in place of attribute values, impression distance conditions comprising at least one of a closest point and a farthest point in said impression coordinate space; and wherein
said arithmetic unit selects animation parts satisfying thus entered said impression distance conditions relative to animation parts selected in the preceding step.

8. An apparatus according to claim 7, wherein
said impression coordinate space is a two-dimensional coordinate space having a coordinate axis along which the impression varies from strong to weak and having a coordinate axis along which the impression varies from warm to cold, with respect to the expression of face as said specific attribute values.

9. An apparatus according to claim 1, wherein
said storage unit stores, as impression data, categories, which are impression regions defined in a predetermined impression coordinate space, of specific attribute values of said animation parts; and wherein
said entry unit enters and designates, in place of an attribute value, a category in said impression coordinate space; and wherein
said arithmetic unit selects an animation part belonging to thus entered and designated said category.

10. An apparatus according to claim 9, wherein
said arithmetic unit, when a plurality of animation parts lie within thus entered and designated said category, selects one of said plurality of animation parts at random.

11. An apparatus according to claim 9, wherein
said storage unit further stores priorities of animation parts belonging to the same category; and wherein
said arithmetic unit, when a plurality of animation parts lie within thus entered and designated said category, selects one of said plurality of animation parts in accordance with said priorities.

12. An animation creating method comprising:
a storage step for storing animation parts indicative of a series of actions and expressions of a person divided into a plurality of frames and for storing attribute values of said animation parts;
an entry step for entering said animation part attribute values in accordance with proceeding of a story; and
an arithmetic step for selecting animation parts from said storage step using said animation part attribute values entered through said entry step, said arithmetic step linking thus selected said animation parts together to create an animation in conformity with said story,
wherein in said arithmetic step, upon the selection of animation parts from said storage step, it is judged whether connectivity of animation parts is good or poor on the basis of attribute values in the current step and in the preceding step, and when poor connectivity is judged, the attribute value is changed so that another animation part is reselected for better connectivity, and
wherein in said arithmetic step, upon the selection of animation parts from said storage step, comparison is made between an attribute value at the foremost frame in the current step and an attribute value at the endmost frame in the preceding step, and when non-coincidence is detected, it is judged that the connectivity of animation parts is defective and the attribute value at the endmost frame in the preceding step is changed into the attribute value at the foremost frame in the current step so that another animation part is reselected.

13. A method according to claim 12, wherein
in said storage step there are stored, as said animation part attribute values, attribute values comprising at least on of a character ID, an expression of a face, a state of a mouth, a state of eyes and a direction of the face.

14. A method according to claim 12, wherein
in said storage step there are stored repetitive animation parts which appear repetitively by the designated number of times, and non-repetitive animation parts which appear only once.

15. A method according to claim 12, wherein
in said entry step there are entered all attribute values consisting of a plurality of items in each proceeding step of said story.

16. A method according to claim 12, wherein
in said entry step there are entered only attribute values which have changed from the preceding step in each proceeding step of said story.

17. A method according to claim 12, wherein
in said storage step there are stored attribute values of the foremost frame and the endmost frame, of said plurality of frames providing said animation parts.

18. A method according to claim 12, wherein
in said storage step there are stored, as impression data, coordinate values in a predetermined impression coordinate space, of a specific attribute value of said animation part; and wherein
in said entry step there are entered, in place of attribute values, impression distance conditions comprising at least one of a closest point and a farthest point in said impression coordinate space; and wherein
in said arithmetic step there are selected animation parts satisfying thus entered said impression distance conditions relative to animation parts selected in the preceding step.

19. A method according to claim 18, wherein
said impression coordinate space is a two-dimensional coordinate space having a coordinate axis along which the impression varies from strong to weak and having a coordinate axis along which the impression varies from warm to cold, with respect to the expression of face as said specific attribute values.

20. A method according to claim 12, wherein
in said storage step there are stored, as impression data, categories, which are impression regions defined in a predetermined impression coordinate space, of specific attribute values of said animation parts; and wherein
in said entry step there is entered and designated, in place of an attribute value, a category in said impression coordinate space; and wherein
in said arithmetic step there is selected an animation part belonging to thus entered and designated said category.

21. A method according to claim 20, wherein
in said arithmetic step, when a plurality of animation parts lie within thus entered and designated said category, one of said plurality of animation parts is selected at random.

22. A method according to claim 20, wherein
in said storage step there are further stored priorities of animation parts belonging to the same category, and wherein in said arithmetic step, when a plurality of animation parts lie within thus entered and designated said category, one of said plurality of animation parts is selected in accordance with said priorities.

23. A computer-readable storage medium having an animation creating program stored therein, said program comprising:
a storage module storing into a storage unit animation parts indicative of a series of actions and expressions of a person divided into a plurality of frames and for storing attribute values of said animation parts;
an entry module entering said animation part attribute values in accordance with proceeding of a story; and
an arithmetic module selecting animation parts from said storage module using said animation part attribute values entered through said entry module, said arithmetic module linking thus selected said animation parts together to create an animation in conformity with said story,
wherein said storage module stores attribute values of the foremost frame and the endmost frame, of said plurality of frames providing said animation parts, and
wherein upon the selection of animation parts from said storage module, said arithmetic module judges whether connectivity of animation parts is good or poor on the basis of attribute values in the current step and in the preceding step, said arithmetic module, when poor connectivity is judged, changing the attribute value to reselect another animation part for better connectivity.

24. An animation creating method comprising:
storing animation parts indicative of a series of actions and expressions of a person divided into a plurality of frames and storing attribute values of the animation parts;
entering the animation part attribute values in accordance with proceeding of a story; and
selecting the animation parts using the animation part attribute values, and linking the selected animation parts together to create an animation in conformity with the story,
wherein in said selecting the animation parts, upon the selection of the animation parts, it is judged whether connectivity of the animation parts is good or poor on the basis of attribute values in the current step and in the preceding step, and when poor connectivity is judged, the attribute value is changed so that another animation part is reselected for better connectivity, and
wherein in said selecting the animation parts, upon the selection of the animation parts, comparison is made between an attribute value at the foremost frame in the current step and an attribute value at the endmost frame in the preceding step, and when non-coincidence is detected, it is judged that the connectivity of the animation parts is defective and the attribute value at the endmost frame in the preceding step is changed into the attribute value at the foremost frame in the current step so that another animation part is reselected.

* * * * *